(12) United States Patent
Ochi et al.

(10) Patent No.: US 10,527,877 B2
(45) Date of Patent: Jan. 7, 2020

(54) DISPLAY DEVICE

(71) Applicant: Japan Display Inc., Tokyo (JP)

(72) Inventors: Tetsuro Ochi, Tokyo (JP); Yasuyuki Hanazawa, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 16/015,675

(22) Filed: Jun. 22, 2018

(65) Prior Publication Data

US 2019/0018275 A1    Jan. 17, 2019

(30) Foreign Application Priority Data

Jul. 11, 2017  (JP) .................. 2017-135720

(51) Int. Cl.
| | |
|---|---|
| *H05K 7/02* | (2006.01) |
| *H05K 7/04* | (2006.01) |
| *G02F 1/1333* | (2006.01) |
| *G06F 1/16* | (2006.01) |
| *H04M 1/02* | (2006.01) |

(52) U.S. Cl.
CPC ...... *G02F 1/133308* (2013.01); *G06F 1/1637* (2013.01); *H04M 1/0266* (2013.01); *G02F 2001/133314* (2013.01); *G02F 2001/133322* (2013.01); *G02F 2001/133331* (2013.01)

(58) Field of Classification Search
USPC ....................................................... 361/807
See application file for complete search history.

(56) References Cited

U.S. PATENT DOCUMENTS

| | | | | |
|---|---|---|---|---|
| 9,201,459 B2* | 12/2015 | Lee | .................. | G06F 1/1637 |
| 9,342,105 B2* | 5/2016 | Choi | .................. | G06F 1/1637 |
| 10,098,245 B2* | 10/2018 | Lin | .................. | G06F 1/1637 |
| 10,289,155 B2* | 5/2019 | Cheng | .................. | G06F 1/1637 |
| 2005/0285991 A1* | 12/2005 | Yamazaki | .......... | G02F 1/133308 |
| | | | | 349/58 |
| 2008/0223708 A1* | 9/2008 | Joo | .................. | H04M 1/0202 |
| | | | | 200/600 |
| 2009/0207629 A1 | 8/2009 | Fujiyama et al. | | |
| 2012/0281380 A1* | 11/2012 | Werner | ............... | G06F 1/1626 |
| | | | | 361/807 |
| 2013/0002133 A1* | 1/2013 | Jin | .................. | H01L 51/524 |
| | | | | 313/511 |
| 2015/0241731 A1 | 8/2015 | Jeong et al. | | |

FOREIGN PATENT DOCUMENTS

JP         4902566 B2   1/2012

* cited by examiner

*Primary Examiner* — Hung S. Bui

(74) *Attorney, Agent, or Firm* — Michael Best & Friedrich LLP

(57) ABSTRACT

According to an aspect, a display device includes: a display panel; a cover panel disposed close to a display surface of the display panel; a housing disposed close to a rear surface of the display panel; and a coupling member coupling the cover panel and the housing to each other. The coupling member includes: a first portion disposed between the cover panel and the display panel, and attached to the cover panel; and a second portion attached to an inside of the housing.

8 Claims, 24 Drawing Sheets

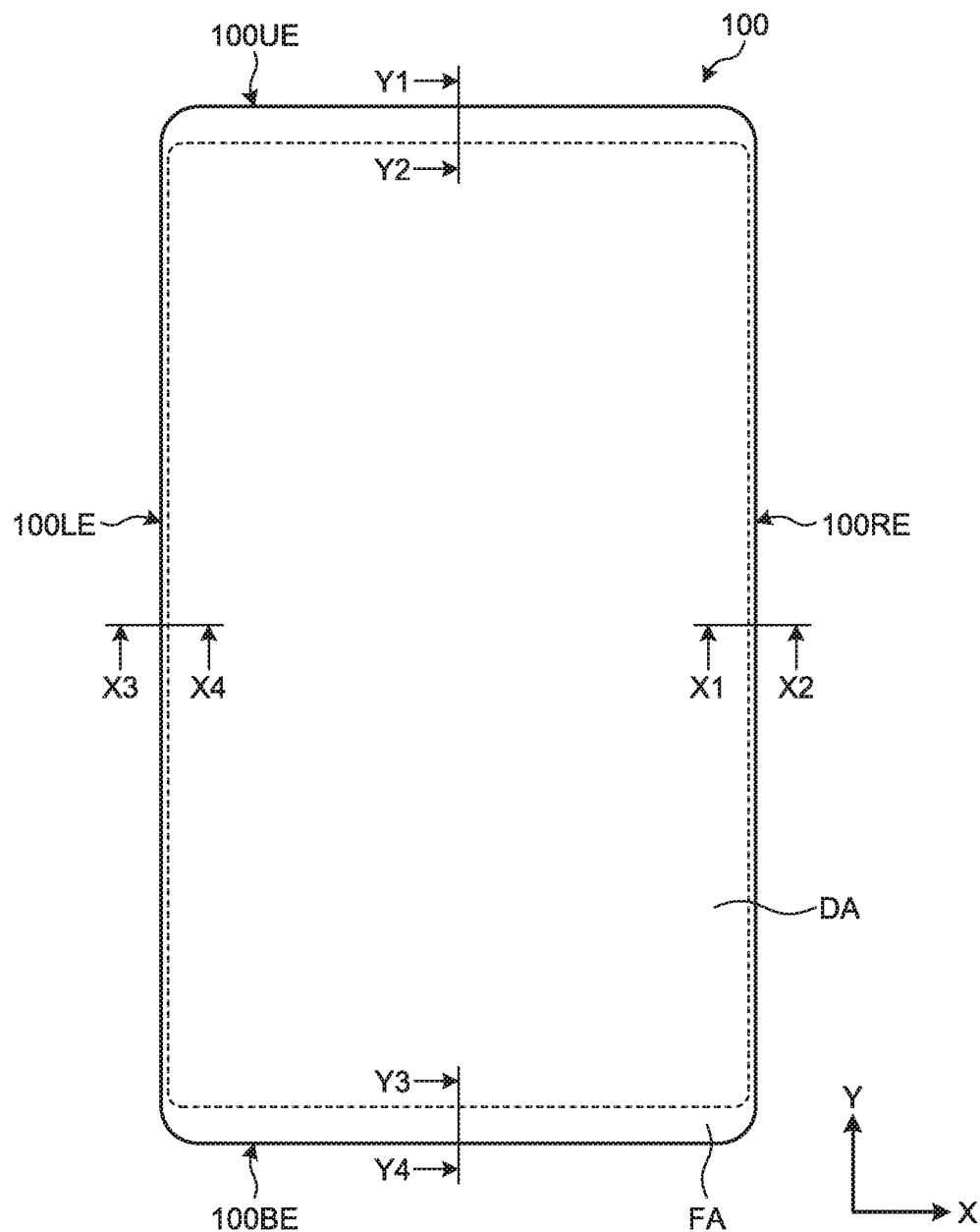

FIG.14
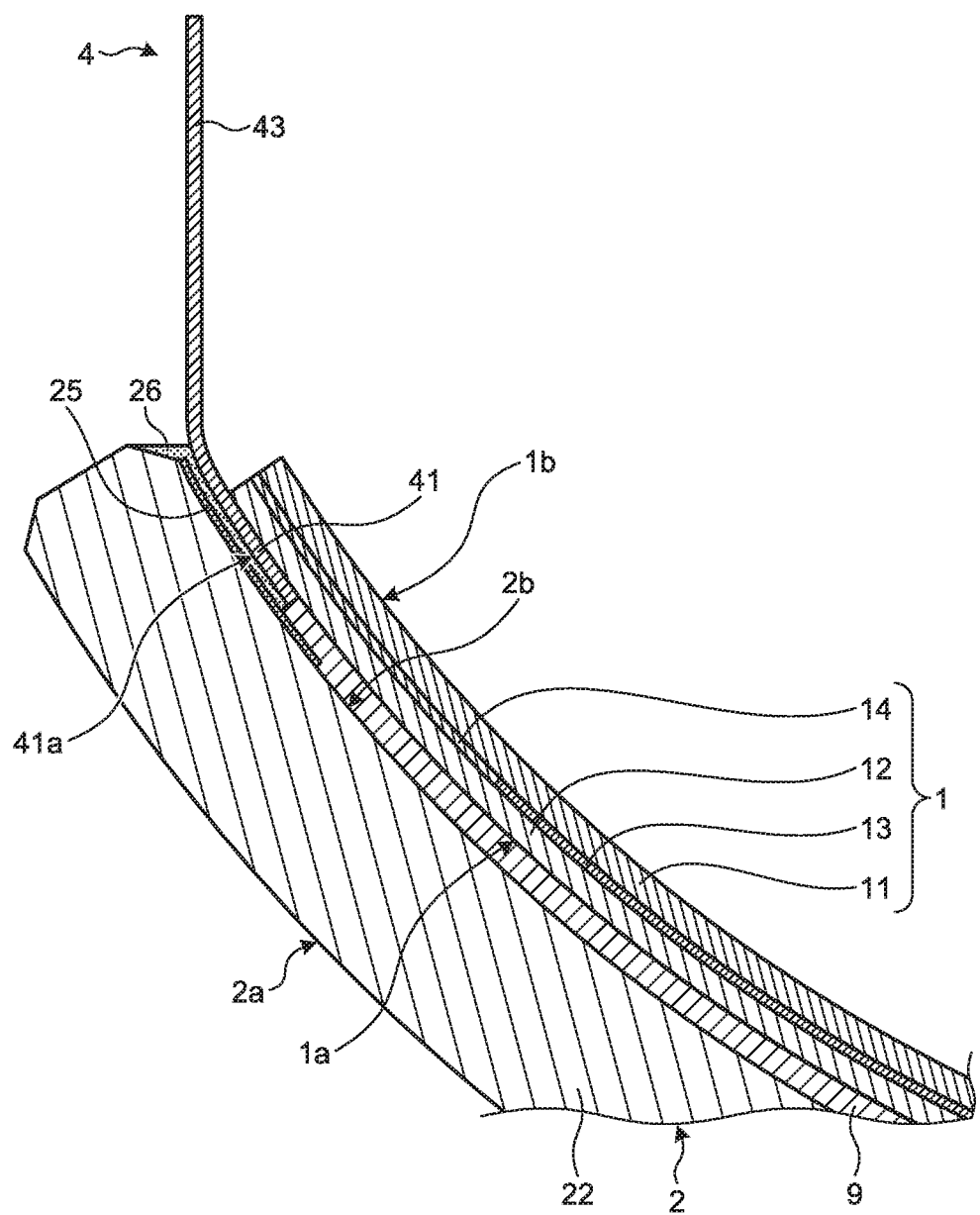
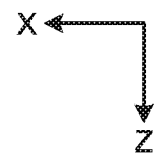

FIG.15
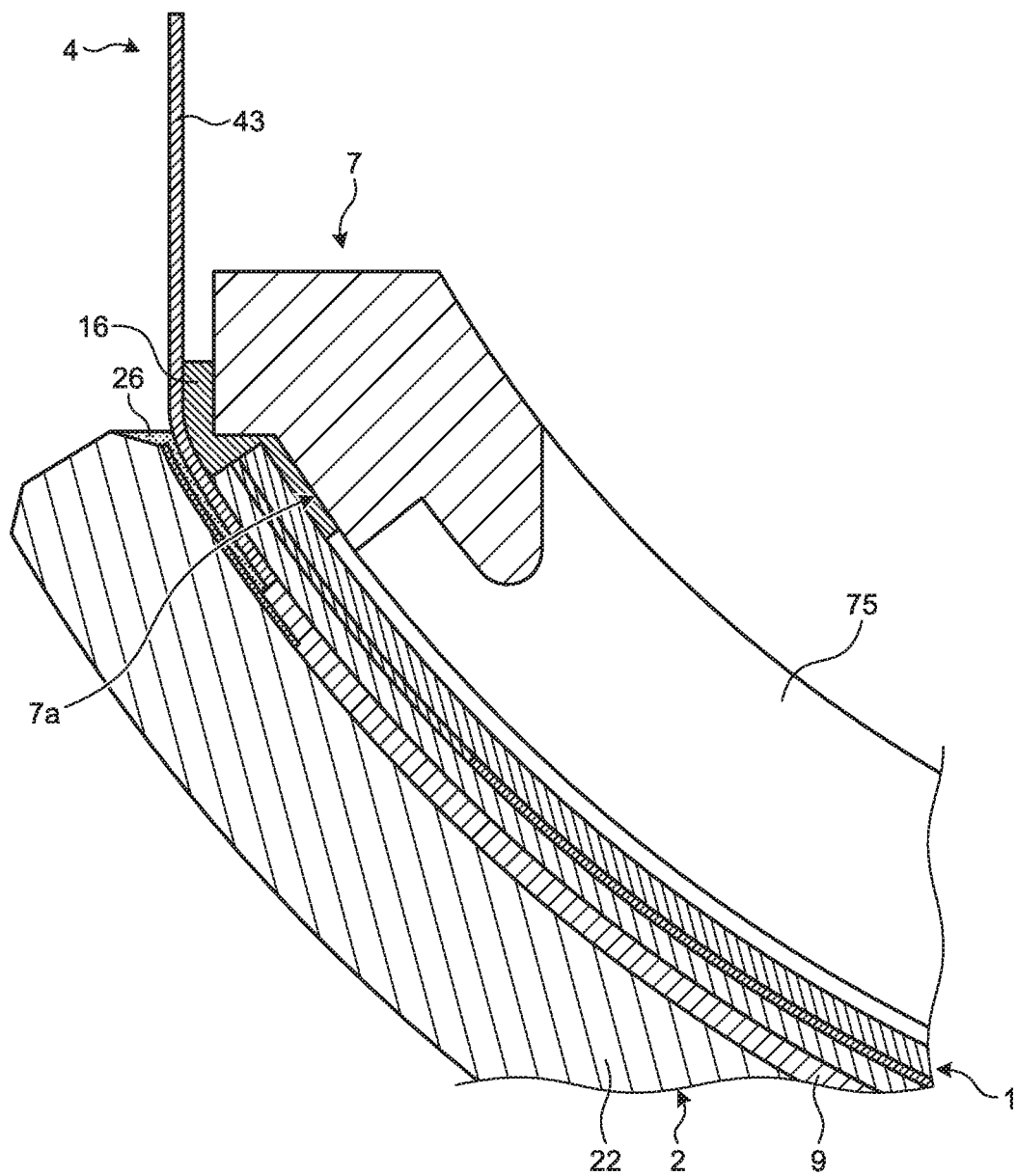
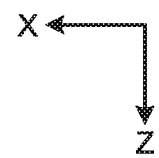

DISPLAY DEVICE

CROSS-REFERENCE TO RELATED APPLICATIONS

This application claims priority from Japanese Application No. 2017-135720, filed on Jul. 11, 2017, the contents of which are incorporated by reference herein in its entirety.

BACKGROUND

1. Technical Field

The present disclosure relates to a display device.

2. Description of the Related Art

Examples of display devices include a transmissive liquid crystal display device that displays an image on a display panel using light from a backlight device disposed close to a rear surface of the display panel, as disclosed in the specification of US Patent Application Publication No. 2015-0241731.

Such a display device is demanded to have a narrow frame, i.e., to reduce a frame region around an outer perimeter of a display region.

SUMMARY

According to an aspect, a display device includes: a display panel; a cover panel disposed close to a display surface of the display panel; a housing disposed close to a rear surface of the display panel; and a coupling member coupling the cover panel and the housing to each other. The coupling member includes: a first portion disposed between the cover panel and the display panel, and attached to the cover panel; and a second portion attached to an inside of the housing.

According to another aspect, a display device includes: a display panel; a cover panel disposed close to a display surface of the display panel; a housing disposed close to a rear surface of the display panel; and a coupling member coupling the cover panel and an inside of the housing to each other. The cover panel includes: a main portion having a flat surface; and an outer perimeter portion positioned around an outer perimeter of the main portion and having a curved surface. The outer perimeter portion is curved in a direction in which the outer perimeter portion approaches the housing. The display panel is curved along the outer perimeter portion.

BRIEF DESCRIPTION OF THE DRAWINGS

FIG. 1A is a plan view illustrating an exemplary configuration of a display device according to a first embodiment;

FIG. 14 is a cross-sectional view illustrating the assembly method of the display device according to the first embodiment process by process;

FIG. 15 is another cross-sectional view illustrating the assembly method of the display device according to the first embodiment process by process;

DETAILED DESCRIPTION

Figure 1B:
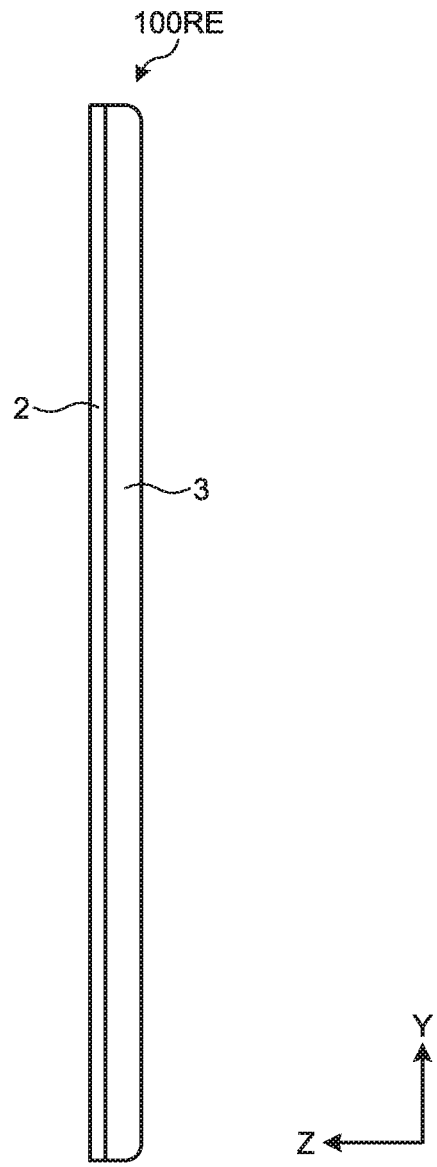
FIG. 1B is a right side view illustrating the exemplary configuration of the display device according to the first embodiment.

Exemplary aspects (embodiments) according to the present disclosure are described below in greater detail with reference to the accompanying drawings. The contents described in the embodiments are not intended to limit the present disclosure. Components described below include components easily conceivable by those skilled in the art and components substantially identical therewith. Furthermore, the components described below can be appropriately combined. The disclosure is given by way of example only, and various changes made without departing from the spirit of the present disclosure and easily conceivable by those skilled in the art are naturally included in the scope of the present disclosure. The drawings may possibly illustrate the width, the thickness, the shape, and the like of each unit more schematically than the actual aspect to simplify the explanation. These elements, however, are given by way of example only and are not intended to limit interpretation of the present disclosure. In the specification and the figures, components similar to those previously described with reference to a preceding figure are denoted by like reference numerals, and detailed explanation thereof will be appropriately omitted. In this disclosure, when an element A is described as being "on" another element B, the element A can be directly on the other element B, or there can be one or more elements between the element A and the other element B.

First Embodiment

Figure 1C:
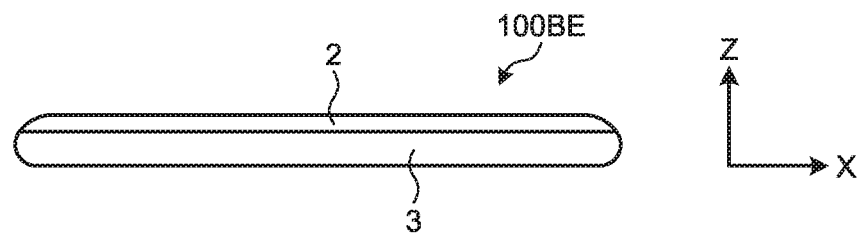
FIG. 1C is a bottom view illustrating the exemplary configuration of the display device according to the first embodiment.
Figure 2:
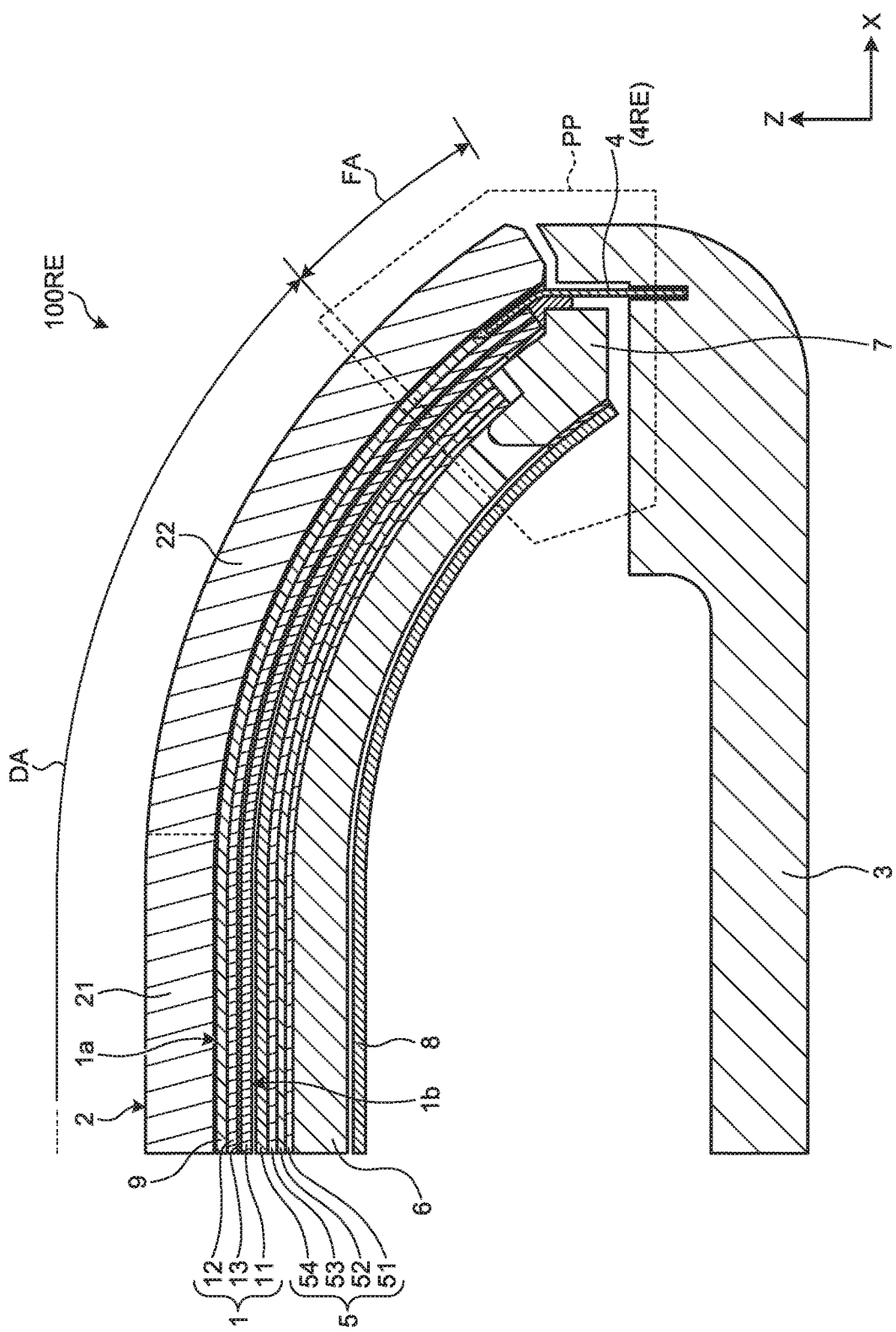
FIG. 2 is a cross-sectional view illustrating the exemplary configuration of the display device according to the first embodiment.
Figure 3:
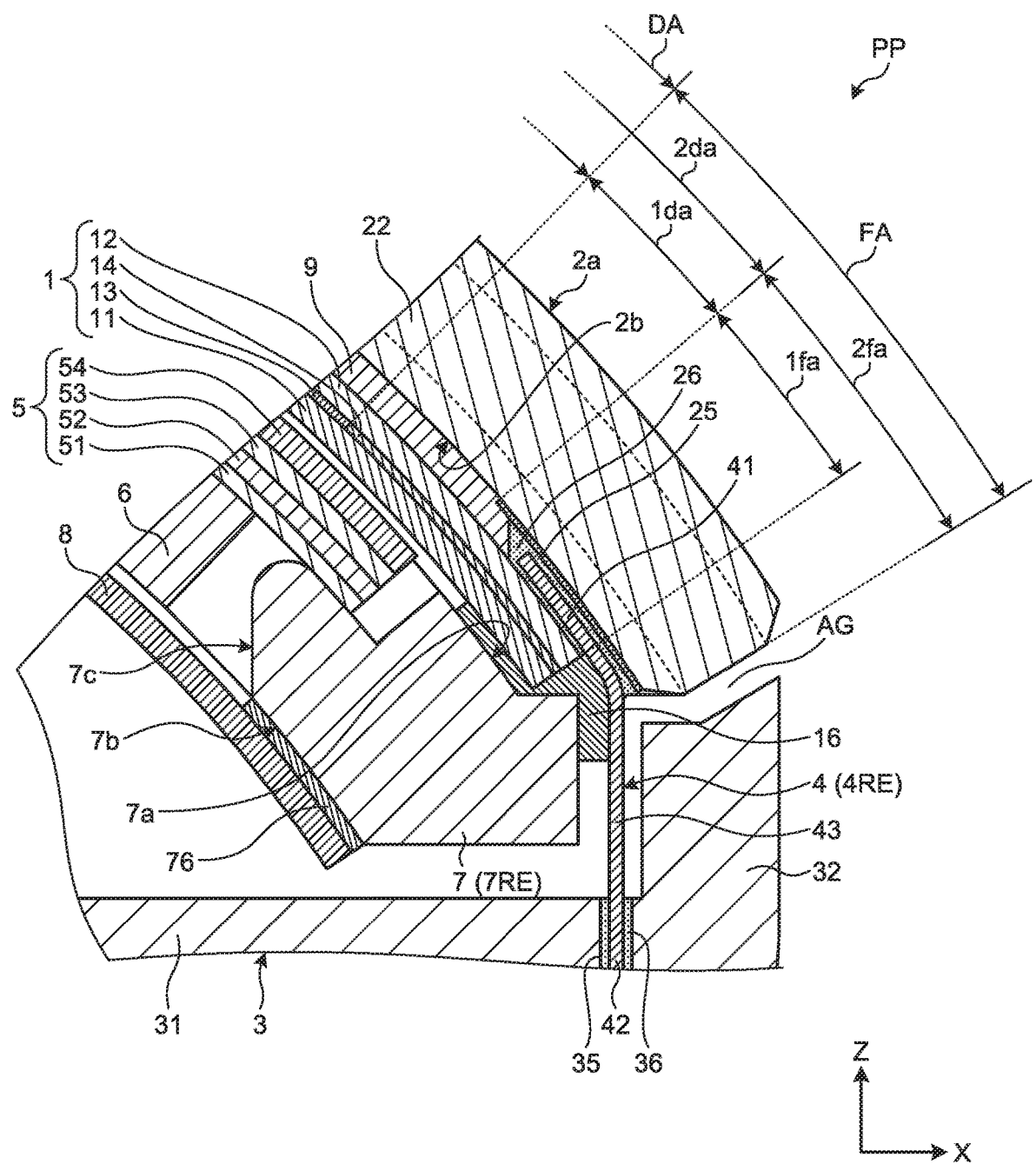
FIG. 3 is another cross-sectional view illustrating the exemplary configuration of the display device according to the first embodiment.
Figure 4:
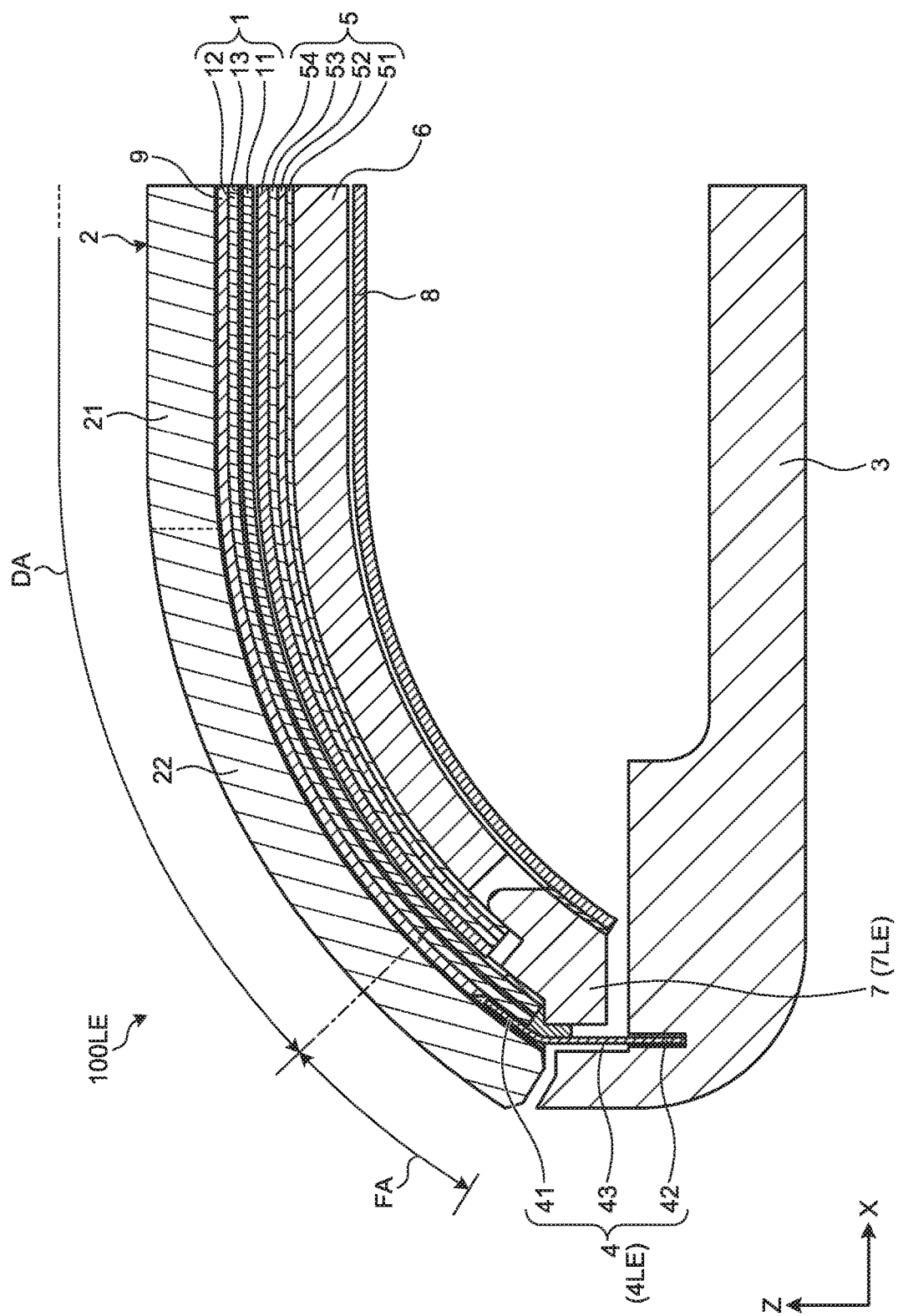
FIG. 4 is another cross-sectional view illustrating the exemplary configuration of the display device according to the first embodiment.
Figure 5:
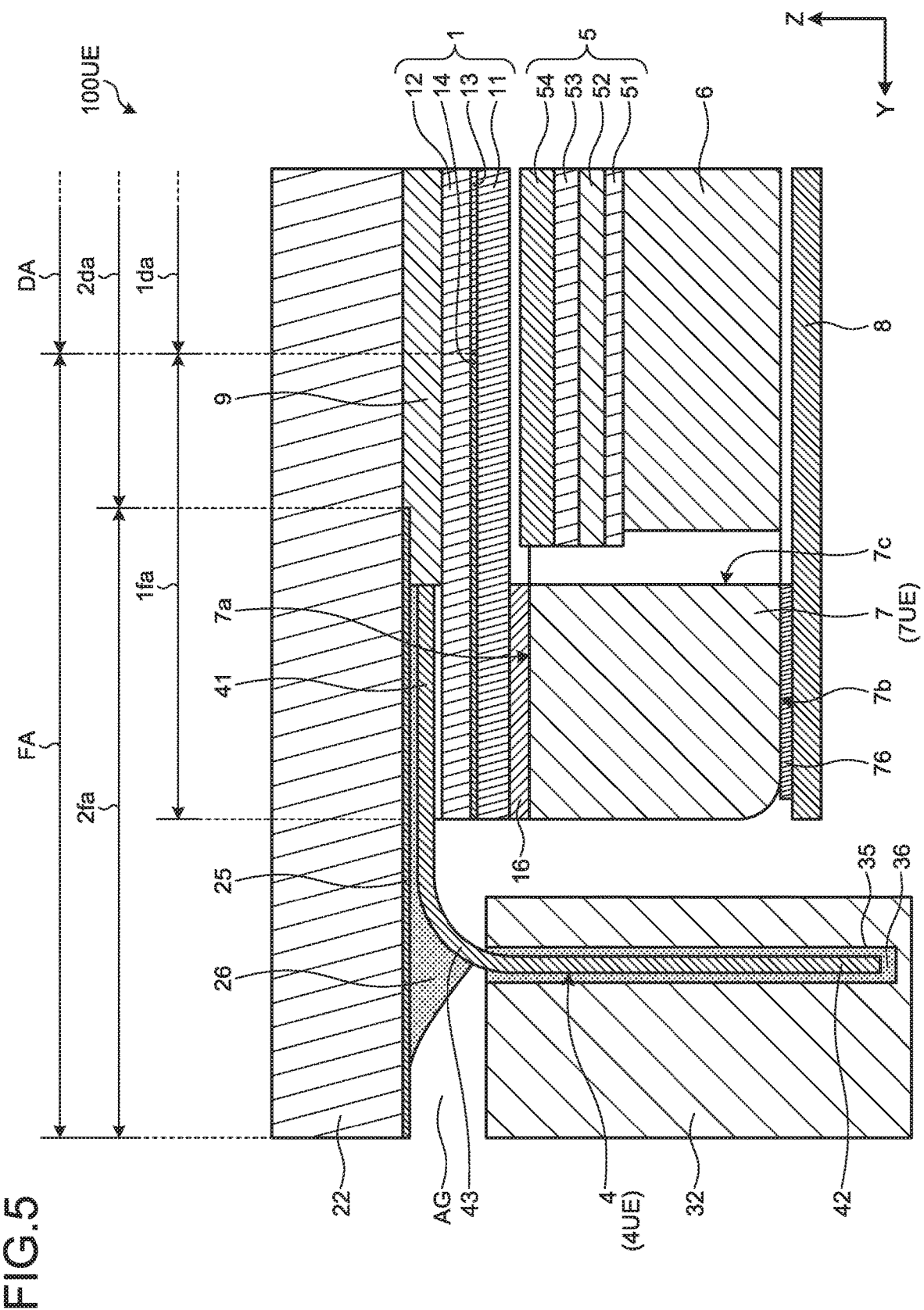
FIG. 5 is another cross-sectional view illustrating the exemplary configuration of the display device according to the first embodiment.
Figure 6:
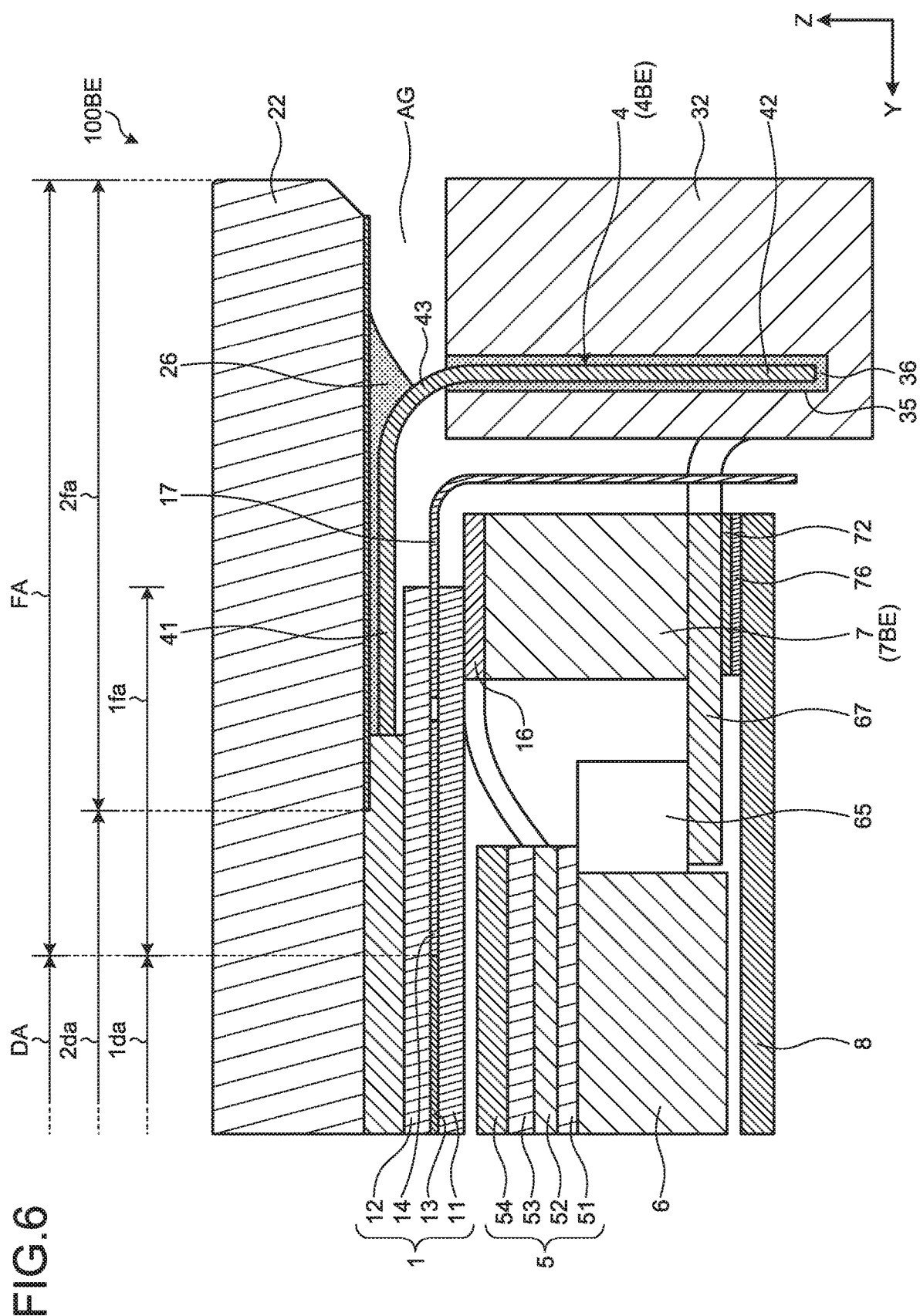
FIG. 6 is another cross-sectional view illustrating the exemplary configuration of the display device according to the first embodiment.

FIGS. 1A, 1B, and 1C are a plan view, a right side view, and a bottom view, respectively, each illustrating an exemplary configuration of a display device according to a first embodiment. FIGS. 2 to 6 are cross-sectional views each illustrating the exemplary configuration of the display device according to the first embodiment. Specifically, FIG. 1B illustrates a right edge portion 100RE of a display device 100. FIG. 1C illustrates a bottom edge portion 100BE of the display device 100. FIG. 2 illustrates a cross-sectional view of the right edge portion 100RE of the display device 100 along a line X1-X2 illustrated in FIG. 1A. FIG. 3 is an enlarged view of part PP enclosed with a broken line in FIG. 2. FIG. 4 illustrates a cross-sectional view of a left edge portion 100LE of the display device 100 along a line X3-X4 illustrated in FIG. 1A. FIG. 5 illustrates a cross-sectional view of a top edge portion 100UE of the display device 100 along a line Y1-Y2 illustrated in FIG. 1A. FIG. 6 illustrates a cross-sectional view of the bottom edge portion 100BE of the display device 100 along a line Y3-Y4 illustrated in FIG. 1A.

In the specification, in each component of the display device, a surface of a display panel on which an image is displayed is defined as a front surface while a surface opposite to the surface on which the image is displayed is defined as a rear surface. The front surface of the display panel described as a display surface. In the specification, the left-right direction in FIGS. 1A to 1C is described as the X-axis direction; the up-down direction in FIGS. 1A to 1C is described as the Y-axis direction; and the direction perpendicular to the X-Y plane in FIGS. 1A to 1C is described as the Z-axis direction. The Z-axis direction is the thickness direction of the display device 100. The up-down direction in FIG. 2 is the thickness direction of the display device 100, i.e., the Z-axis direction.

As illustrated in FIGS. 1A to 6, the display device 100 in the first embodiment includes a display panel 1, a cover panel 2, a housing 3, a coupling member 4, an optical sheet 5, a light guiding plate 6, a supporting member 7, a reflection sheet 8, an adhesive layer 9, and a light source 65. The display device 100 is a transmissive liquid crystal display device, for example. The display device 100 includes a display region DA that displays an image and a frame region FA positioned around the outer perimeter of the display region DA. The display region DA overlaps with both of a display region 1da of the display panel 1 and a light transmissive region 2da of the cover panel 2 in a plan view. In the specification, the term "in a plan view" means viewing in the Z-axis direction. The frame region FA overlaps with at least one of a peripheral region 1fa of the display panel 1 and a light blocking region 2fa of the cover panel 2 in a plan view.

The display panel 1 includes the display region 1da that displays an image and the peripheral region 1fa positioned around the periphery of the display region 1da. The peripheral region 1fa surrounds the display region 1da, for example. The display panel 1 selectively transmits light output from the light guiding plate 6 from a rear surface 1b to a display surface 1a of the display panel 1, thereby displaying an image in the display region 1da. The peripheral region 1fa blocks light output from the light guiding plate 6. For example, light output from the light guiding plate 6 is blocked by a sealing member 14 in the peripheral region 1fa. Alternatively, a light blocking material may be provided in a region overlapping with the sealing member 14 besides the sealing member 14. The shape of the display panel 1 in a plan view (hereinafter, described as a planar shape) is rectangle, for example.

The display panel 1 includes a first substrate 11, a second substrate 12, a liquid crystal layer 13, the sealing member 14, and a drive control flexible printed circuit (FPC) 17 coupled to the first substrate 11.

The first substrate 11 and the second substrate 12, which are a pair of substrates, sandwich the liquid crystal layer 13. The first substrate is a flat plate having a rectangular planar shape, for example. The first substrate 11 includes a first polarizing plate and a thin film transistor (TFT) substrate disposed close to the front surface of the first polarizing plate. The second substrate 12 is a flat plate having a rectangular planar shape. The second substrate 12 includes a color filter colored in red (R), green (G), and blue (B) corresponding to a pixel and a second polarizing plate disposed close to the front surface side of the color filter.

The liquid crystal layer 13 is disposed in the display region 1da, and is interposed between the first substrate 11 and the second substrate 12. The liquid crystal layer 13 transmits or blocks light incident on the liquid crystal layer 13 for each sub pixel by a voltage being applied between a common electrode and a corresponding pixel electrode, which are not illustrated. A change in voltage level of the corresponding pixel electrode adjusts a light transmittance level in the liquid crystal layer 13 for each sub pixel. When a display mode of the display panel 1 is a lateral electric field mode, the common electrode and the pixel electrodes are provided on the first substrate 11, for example. When the display mode of the display panel 1 is a vertical electric field mode, the pixel electrodes are provided on the first substrate 11 while the common electrode is provided on the second substrate 12.

The sealing member 14 is disposed between the first substrate 11 and the second substrate 12 in the peripheral region 1fa. The sealing member 14, which surrounds the liquid crystal layer 13, prevents leakage of the liquid crystal layer 13 from between the first substrate 11 and the second substrate 12. The sealing member 14 is black, for example, and has light blocking property. Alternatively, a light blocking member may be provided in a region overlapping with the sealing member 14 besides the sealing member 14.

The drive control FPC 17 is attached to the first substrate 11 in the peripheral region 1fa. The drive control FPC 17 is attached to the first substrate 11 with an anisotropic conductive film (ACF), which is not illustrated, interposed therebetween, for example, and extends outside the first substrate 11. A driver IC (not illustrated) driving the display panel 1 and electronic components (not illustrated), for example, are mounted on the drive control FPC 17. The drive control FPC 17 supplies a signal for driving the display panel 1 to the first substrate 11. The signal supplied from the drive control FPC 17 causes the display panel 1 to selectively transmit light from the light guiding plate 6 to the display region 1da and display an image in the display region 1da.

The cover panel 2 is disposed close to the display surface 1a of the display panel 1. The cover panel 2 covers and protects the display surface 1a of the display panel 1. The cover panel 2 has a rectangular planar shape, for example in a plan view, the cover panel 2 is larger than the display panel 1. The edge portion of the cover panel 2 is positioned closer to the outer perimeter of the display device 100 than the edge portion of the display panel 1. The cover panel 2 includes a main portion 21 having flat surfaces in parallel with the X-Y plane and an outer perimeter portion 22 positioned around the outer perimeter of the main portion 21. The main portion has a front surface 2a and a rear surface 2b, which are flat surfaces in parallel with the X-Y plane. In the right edge portion 100RE and the left edge portion 100LE of the display device 100, the outer perimeter portion 22 has curved surfaces and is curved in a direction in which the outer perimeter portion 22 approaches the housing 3. In the right edge portion 100RE and the left edge portion 100LE, the front surface 2a and the rear surface 2b of the outer perimeter portion 22 are curved surfaces. In the top edge portion 100UE and the bottom edge portion 100BE, the outer perimeter portion 22 has flat surfaces in parallel with the X-Y plane in the same manner as the main portion 21. In the top edge portion 100UE and the bottom edge portion 100BE, the outer perimeter portion 22 has no curved surface and is not curved.

The cover panel 2 includes the light transmissive region 2da and the light blocking region 2fa positioned close to the outer perimeter of the light transmissive region 2da. The main portion 21 has only the light transmissive region 2da, for example. The outer perimeter portion 22 has the light transmissive 2da and the light blocking region 2fa. A light blocking member 25 is disposed close to the rear surface 2b of the light blocking region 2fa. The material of the cover panel 2 is glass or a resin, for example.

The adhesive layer 9, which is disposed between the display panel 1 and the cover panel 2, adhesively bonds the display panel 1 to the cover panel 2. The adhesive layer 9 is a member having high translucency and adhesiveness (viscosity). The adhesive layer 9 is an optical clear adhesive (OCA) film or an optical clear resin (OCR) that is a liquid ultra violet (UV) curable resin, for example.

The optical sheet 5 is disposed close to the rear surface 1b of the display panel 1. The optical sheet 5, which is a transmissive optical member, adjusts optical characteristics of light output from an emission surface of the light guiding plate 6. The optical sheet 5 includes a first diffuser plate 51, a first prism sheet 52 disposed on the first diffuser plate 51, a second prism sheet 53 disposed on the first prism sheet 52, and a second diffuser plate 54 disposed on the second prism sheet 53. Each of the first diffuser plate 51 and the second diffuser plate 54 internally diffuses light that has entered from the rear surface, and homogenizes brightness of light output from the front surface. Each of the first prism sheet 52 and the second prism sheet 53 controls directivity of light entering from the rear surface to enhance brightness of light output from the front surface.

The light guiding plate 6 is disposed close to the rear surface of the optical sheet 5. The light guiding plate 6 internally diffuses light that has entered from an incident surface thereof, and outputs diffused light from the emission surface thereof. The light incident surface of the light guiding plate 6 is a side surface of the light guiding plate 6 in the bottom edge portion 100BE of the display device 100, for example. The light emission surface of the light guiding plate 6 is the front surface of the light guiding plate 6. Light output from the front surface of the light guiding plate 6 is incident on the optical sheet 5. The light guiding plate 6 has a rectangular planar shape. The light source 65 is disposed in the bottom edge portion 100BE of the display device 100. A light source control FPC 67 is coupled to the light source 65, for example. The light source 65 receives electric power from a battery, which is not illustrated, via the light source control FPC 67. With this configuration, the light source 65 emits light toward the incident surface of the light guiding plate 6.

The reflection sheet 8 is disposed close to the rear surface of the light guiding plate 6. The reflection sheet 8 reflects light leaked from the rear surface of the light guiding plate 6 to cause the light to be incident on the light guiding plate 6. The reflection sheet 8 may have a function to diffuse light and another function to scatter light in addition to the reflection function, for example. Disposing the reflection sheet 8 close to the rear surface of the light guiding plate 6 allows the display device 100 to efficiently use light entering the light guiding plate 6 from the light source unit 65, thereby enhancing the luminance of light output from the light guiding plate 6. The reflection sheet 8 is an enhanced specular reflector (ESR) sheet, for example. The reflection sheet 8 may be a silver deposited film, a multilayered reflection film, or a white polyethylene terephthalate (PET) sheet. The reflection sheet 8 is attached to the supporting member 7 with a double-sided adhesive tape 76 interposed therebetween.

The housing 3 is disposed close to the rear surface 1b of the display panel 1. The housing 3 covers the rear surface 1b of the display panel 1. The housing 3 houses a battery, electronic components, and boards, which are not illustrated, for example. The housing 3 includes a bottom portion 31, a wall portion 32 standing from the outer edge of the bottom portion 31 toward the display panel 1, and a groove 35 provided in the bottom portion 31 along the wall portion 32, for example. The housing 3 includes an outer frame made of a metal (metal plate) and a resin mold inside the outer frame, for example.

The coupling member 4 couples the outer perimeter portion 22 to the inside of the housing 3. The coupling member 1 includes a first portion 41, a second portion 42 on the opposite side of the first portion 41, and a third portion 43 positioned between the first portion 41 and the second portion 42. The first portion 41 is disposed between the peripheral region 1fa of the display panel 1 and the outer perimeter portion 22 of the cover panel 2. The first portion 41 is fixed to the rear surface 2b of the outer perimeter portion 22 through the light blocking member 25 and an adhesive 26. The second portion 42, which is disposed in the groove 35 of the housing 3, is fixed to the side surfaces and the bottom surface of the groove 35 through an adhesive 36. The third portion 43 is disposed along the wall portion 32 of the housing 3. With this configuration, the coupling member 4 fixes the cover panel 2 to the housing 3. The coupling member 4 is made of a metal (metal plate), for example.

Figure 7:
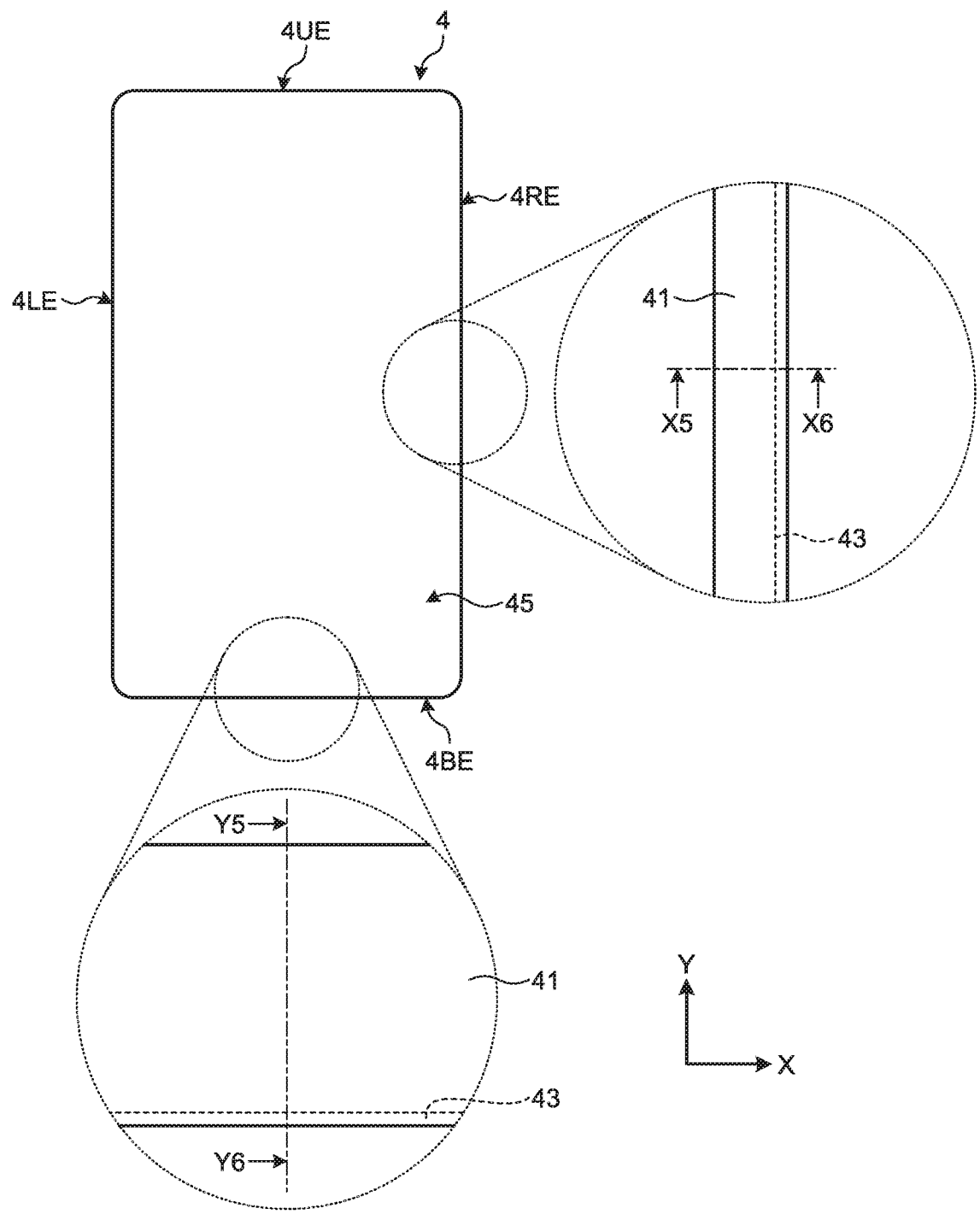
FIG. 7 is a plan view illustrating an exemplary configuration of a coupling member according to the first embodiment.
Figure 8:
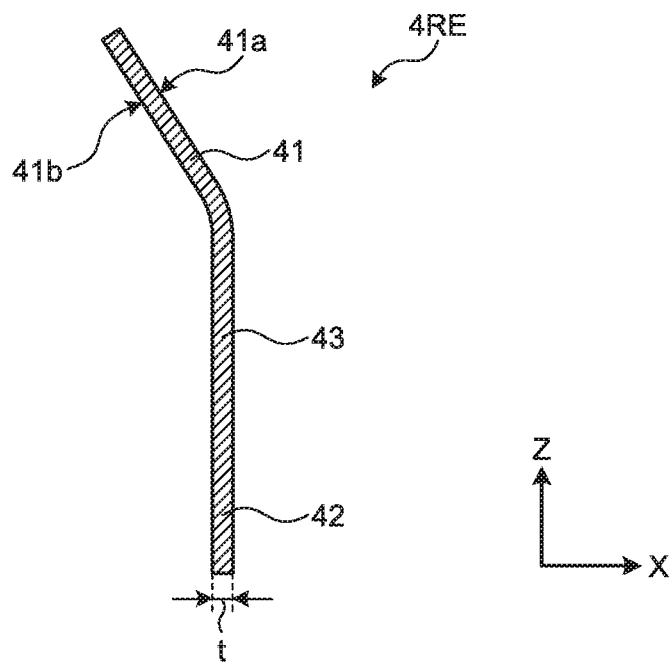
FIG. 8 is a cross-sectional view illustrating a right edge portion of the coupling member according to the first embodiment.
Figure 9:
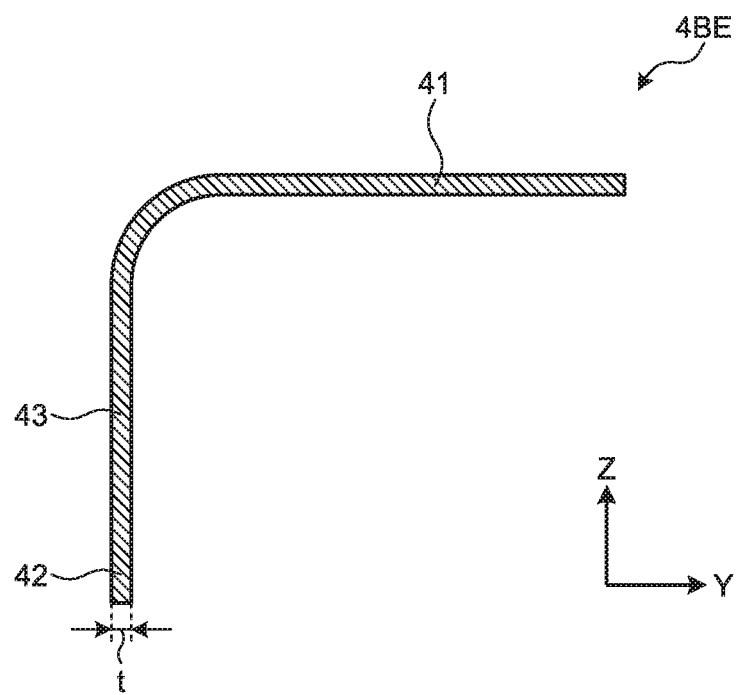
FIG. 9 is a cross-sectional view illustrating a bottom edge portion of the coupling member according to the first embodiment.

FIG. 7 is a plan view illustrating an exemplary configuration of the coupling member according to the first embodiment. FIG. 8 is a cross-sectional view illustrating a right edge portion of the coupling member. FIG. 8 illustrates a cross-sectional view of a right edge portion 4RE illustrated in FIG. 7 along the line X5-X6. FIG. 9 is a cross-sectional view illustrating a bottom edge portion of the coupling member. FIG. 9 illustrates a cross-sectional view of a bottom edge portion 4BE illustrated in FIG. 7 along the line Y5-Y6.

The supporting member supports the optical sheet toward the display panel 1. As illustrated in FIG. 7, the coupling member 4 is a frame body. The coupling member 4 includes the right edge portion 4RE, a left edge portion 4LE, a top edge portion 4UE, and the bottom edge portion 4BE. The position of the right edge portion 4RE of the coupling member 4 corresponds to that of the right edge portion 100RE of the display device 100 (refer to FIG. 1A). The position of the left edge portion 4LE of the coupling member 4 corresponds to that of the left edge portion 100LE of the display device 100 (refer to FIG. 1A). The position of the top edge portion 4UE of the coupling member 4 corresponds to that of the top edge portion 100UE of the display device 100 (refer to FIG. 1A). The position of the bottom edge portion 4BE of the coupling member 4 corresponds to that of the bottom edge portion 100BE of the display device 100 (refer to FIG. 1A). The display panel 1 (refer to FIG. 1A) is disposed in an inside 45 of the frame body constituted by the right edge portion 4RE, the left edge portion 4LE, the top edge portion 4UE, and the bottom edge portion 4BE. The coupling member 4 surrounds the display panel 1.

As illustrated in FIG. 8, the first portion 41 is curved along the outer perimeter portion 22 of the cover panel 2 (refer to FIG. 3), in the right edge portion 4RE. For example, each of a first surface 41a and a second surface 41b of the first portion 41 is curved along the rear surface 2b of the outer perimeter portion 22 facing the first portion 41. This configuration allows the first portion 41 to have a wide bonding area with respect to the cover panel 2, thereby increasing a bonding strength of the first portion 41 to the cover panel 2. The shape of the left edge portion 4LE (refer to FIG. 7) and the shape of the right edge portion 4RE are symmetric about the Y-Z plane. The size of the left edge portion 4LE is the same as that of the right edge portion 4RE.

As illustrated in FIG. 9, the first portion 41 is not curved but is in parallel with the X-Y plane in the bottom edge portion 4BE. The shape of the top edge portion 4UE and the shape of the bottom edge portion 4BE are symmetric about the Y-Z plane. The size of the top edge portion 4UE (refer to FIG. 7) is the same as that of the bottom edge portion 4BE.

In the examples illustrated in FIGS. 8 and 9, a thickness t of the coupling member 4 is constant. Specifically, the thickness t has the same value in the first portion 41, the second portion 42, and the third portion 43. Further, the thickness t has the same value in the right edge portion 4RE, the left edge portion 4LE, the bottom edge portion 4BE, and the top edge portion 4UE. The thickness of the coupling member 4 in the first portion 41, the second portion 42, and the third portion 43, however, may differ from one another. For example, the thickness of the third portion 43 may be larger than those of the first portion 41 and the second portion 42. This configuration can increase strength.

As illustrated in FIGS. 2 to 6, the supporting member 7 is disposed close to the rear surface 1b of the display panel 1. The supporting member 7 is attached to the peripheral region 1fa of the display panel 1 with an adhesive 16 interposed therebetween. The supporting member 7 is made of plastic (synthetic resin), for example. The adhesive 16 is a room temperature vulcanizing (RTV) resin, for example.

Figure 10:
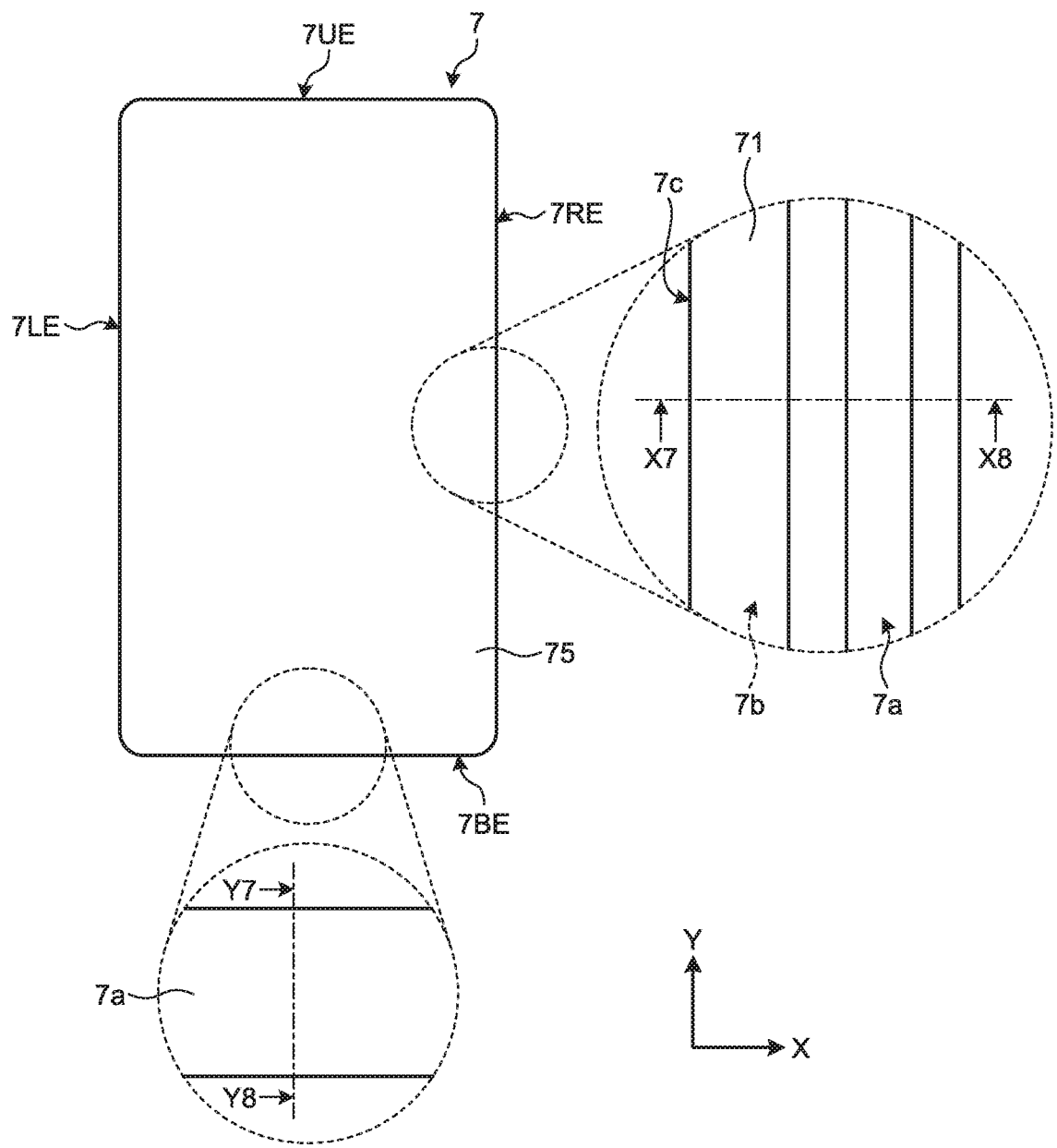
FIG. 10 is a plan view illustrating an exemplary configuration of a supporting member according to the first embodiment.
Figure 11:
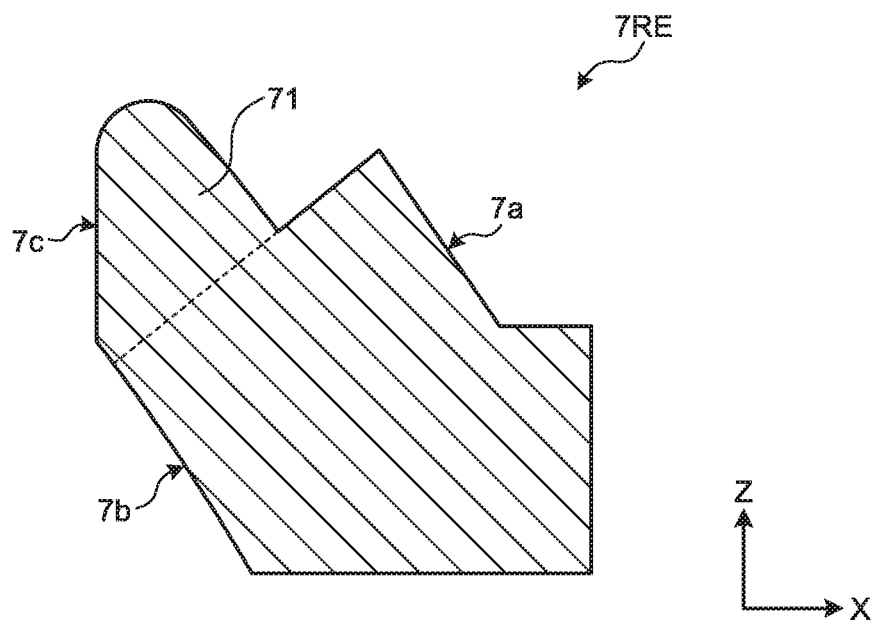
FIG. 11 is a cross-sectional view illustrating the right edge portion of the coupling member according to the first embodiment.
Figure 12:
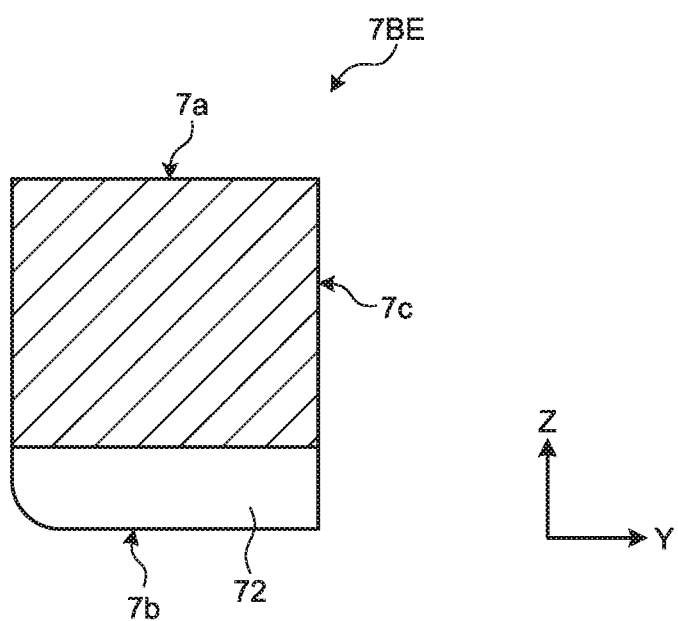
FIG. 12 is a cross-sectional view illustrating the bottom edge portion of the coupling member according to the first embodiment.

FIG. 10 is a plan view illustrating an exemplary configuration of the supporting member according to the first embodiment. FIG. 11 is a cross-sectional view illustrating a right edge portion of the supporting member according to the first embodiment. FIG. 11 illustrates a cross-sectional view of a right edge portion 7RE illustrated in FIG. 10 along the line X7-X8. FIG. 12 is a cross-sectional view illustrating a bottom edge portion of the supporting member according to the first embodiment. FIG. 12 illustrates a cross-sectional view of a bottom edge portion 7BE illustrated in FIG. 10 along the line Y7-Y8.

As illustrated in FIG. 10, the supporting member 7 is a frame body. The supporting member 7 includes the right edge portion 7RE, a left edge portion 7LE, a top edge portion 7UE, and the bottom edge portion 7BE. The position of the right edge portion 7RE of the supporting member 7 corresponds to that of the right edge portion 100RE of the display device 100 (refer to FIG. 1A). The position of the left edge portion 7LE of the supporting member 7 corresponds to that of the left edge portion 100LE of the display device 100 (refer to FIG. 1A). The position of the top edge portion 7UE of the supporting member 7 corresponds to that of the top edge portion 100UE of the display device 100 (refer to FIG. 1A). The position of the bottom edge portion 7BE of the supporting member 7 corresponds to that of the bottom edge portion 100BE of the display device 100 (refer to FIG. 1A). The display panel 1 (refer to FIG. 1A) is disposed in an inside 75 of the frame body constituted by the right edge portion 7RE, the left edge portion 7LE, the top edge portion 7UE, and the bottom edge portion 7BE.

As illustrated in FIGS. 11 and 12, the supporting member 7 includes a first surface 7a facing the rear surface 2b (refer to FIG. 3) of the outer perimeter portion 22 of the cover panel 2, and a second surface 7b positioned on the opposite side of the first surface 7a. In addition, the supporting member 7 includes a third surface 7c positioned between the first surface 7a and the second surface 7b, and facing the inside 75 of the supporting member 7. As illustrated in FIG. 11, the third surface 7c is tilted with respect to the first surface 7a and the second surface 7b, in the right edge portion 7RE. For example, each of the first surface 7a and the second surface 7b is a flat surface intersecting the Z-axis direction. The third surface 7c is a flat surface in parallel with a thickness direction of the supporting member 7. The thickness direction of the supporting member 7 is the Z-axis direction, for example.

The first surface 7a in the right edge portion 7RE is curved along the outer perimeter portion 22 facing the right edge portion 7RE. The display panel 1 is curved along the outer perimeter portion 22 of the cover panel 2 (refer to FIG. 3). This configuration allows the supporting member 7 in the right edge portion 7RE to have a wide bonding area with respect to the display panel 1 thereby increasing a bonding strength of the supporting member 7 to the display panel 1. Further, the second surface 7b in the right edge portion 7RE is curved along the outer perimeter portion 22 facing the right edge portion 7RE. This configuration allows the reflection sheet 8 to be fixed to the second surface 7b in the state in which the reflection sheet 8 (refer to FIG. 3) is curved along the cover panel 2. The supporting portion 7 in the right edge portion 7RE includes a latch 71 that latches the optical sheet 5 (refer to FIG. 3) toward the display panel 1. This configuration eliminates the need of applying an adhesive on the rear surface of the display panel 1 to attach the optical sheet 5 to the display panel 1. The shape of the left edge portion 7LE (refer to FIG. 10) and the shape of the right edge portion 7RE are symmetric about the Y-Z plane. The size of the left edge portion LE is the same as that of the right edge portion 7RE.

As illustrated in FIG. 12, the third surface 7c in the bottom edge portion 7BE is perpendicular to each of the first surface 7a and the second surface 7b. The third surface 7c in the bottom edge portion 7BE is in parallel with the X-Z plane. In the same manner as in the bottom edge portion 7BE, the third surface 7c in the top edge portion 7UE is perpendicular to each of the first surface 7a and the second surface 7b, and in parallel with the X-Z plane (refer to FIG. 5).

The supporting member 7 in the bottom edge portion 7BE has a groove 72 on the second surface 7b. The groove 72 is formed to penetrate the supporting member 7 from the inside 75 to the outside of the supporting member 7. The light source control FPC 67 (refer to FIG. 6) coupled to the light source 65 is routed through the groove 72. The top edge portion 7UE may be or may not be provided with the groove 72.

Figure 13:
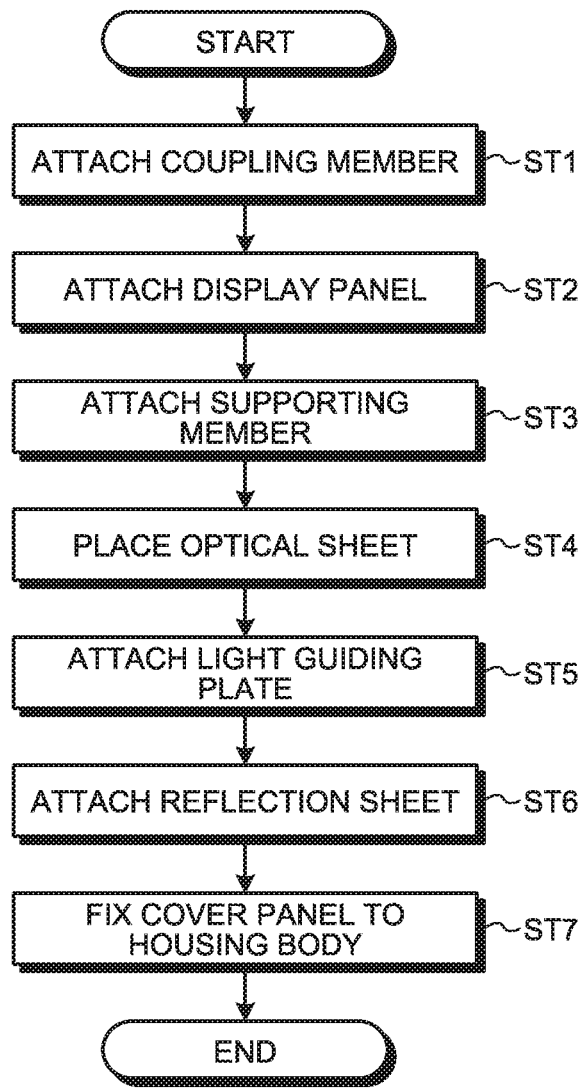
FIG. 13 is a flowchart illustrating an assembly method of the display device according to the first embodiment in a process sequence.
Figure 16:
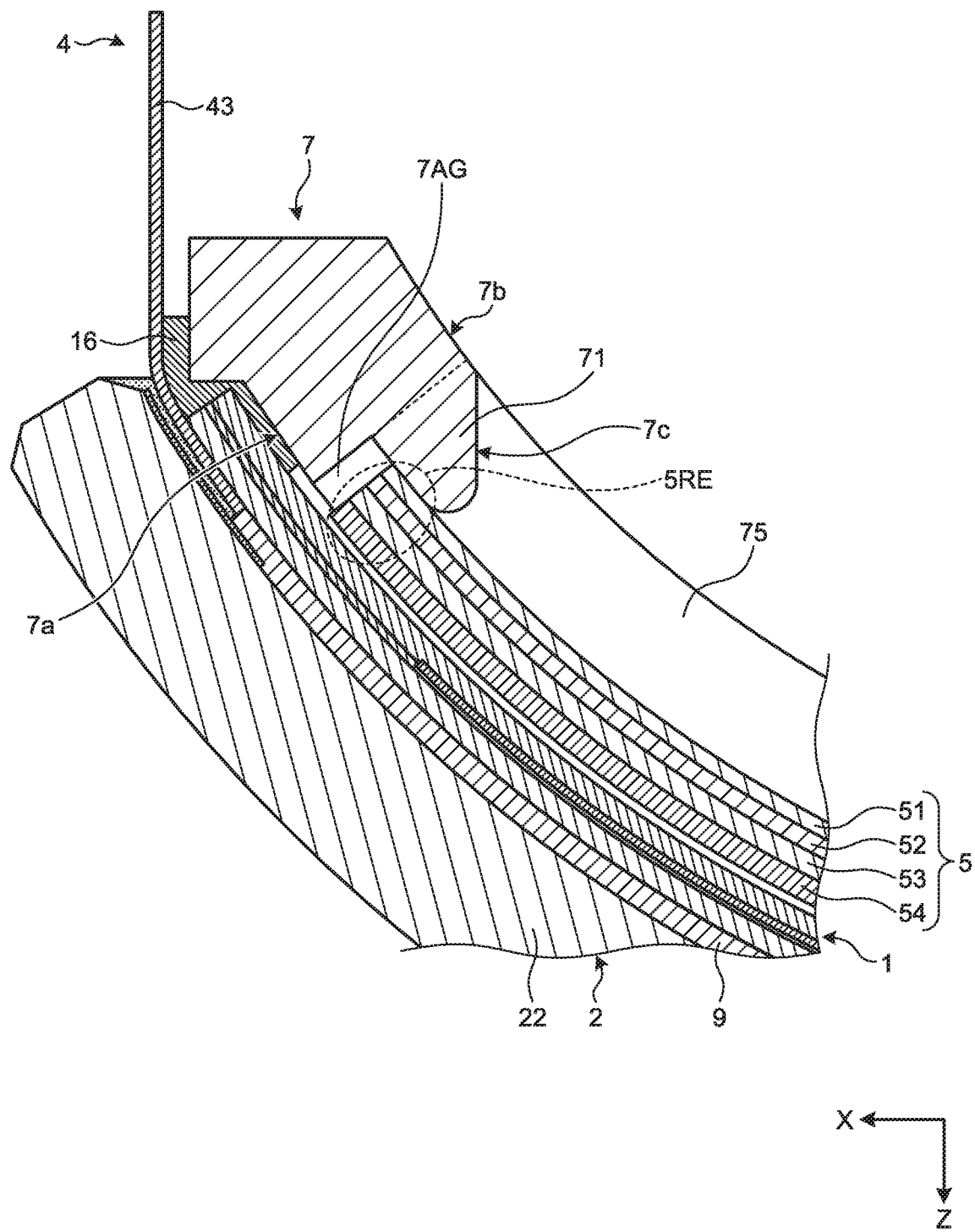
FIG. 16 is another cross-sectional view illustrating the assembly method of the display device according to the first embodiment process by process.
Figure 17:
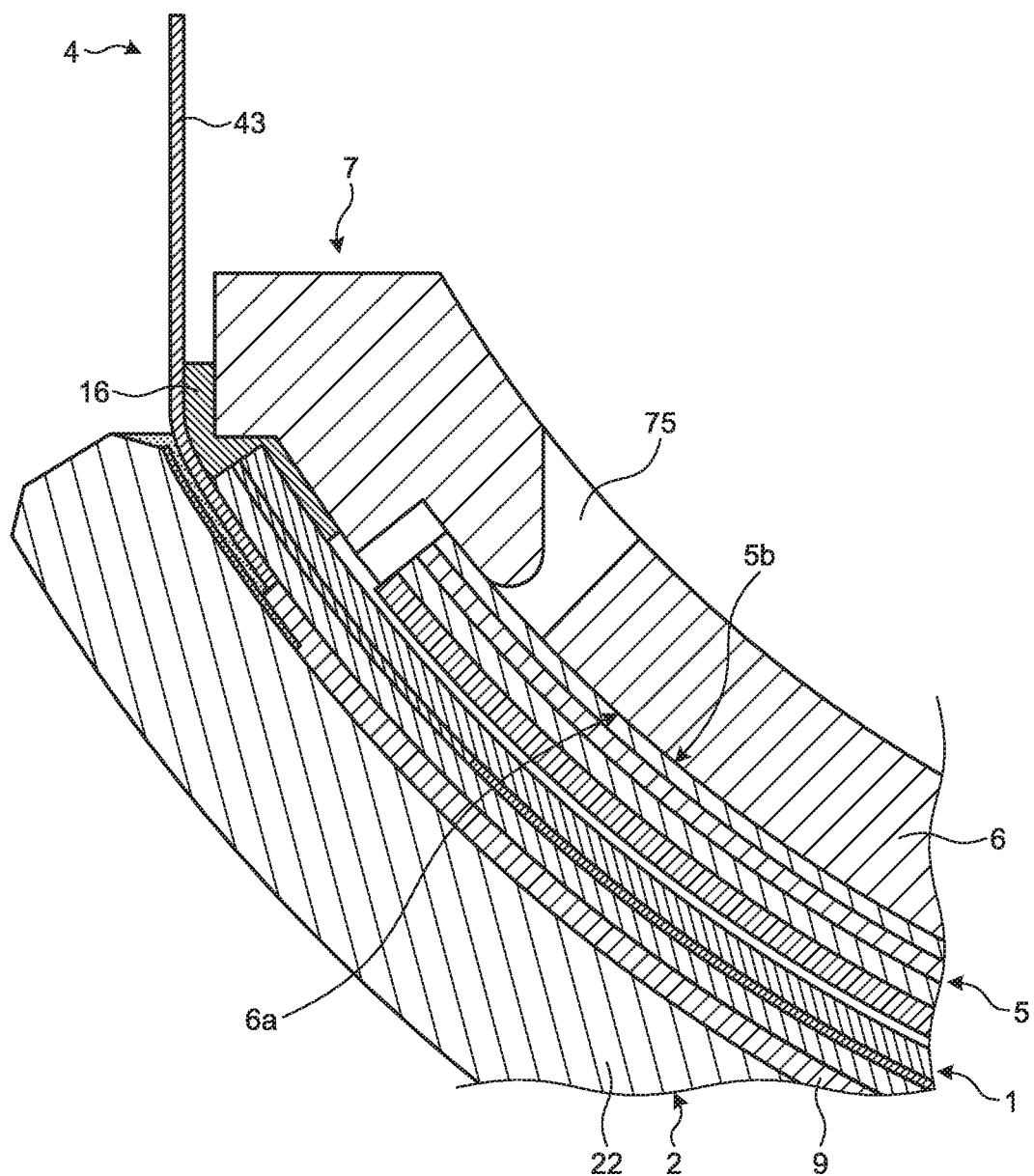
FIG. 17 is another cross-sectional view illustrating the assembly method of the display device according to the first embodiment process by process.
Figure 18:
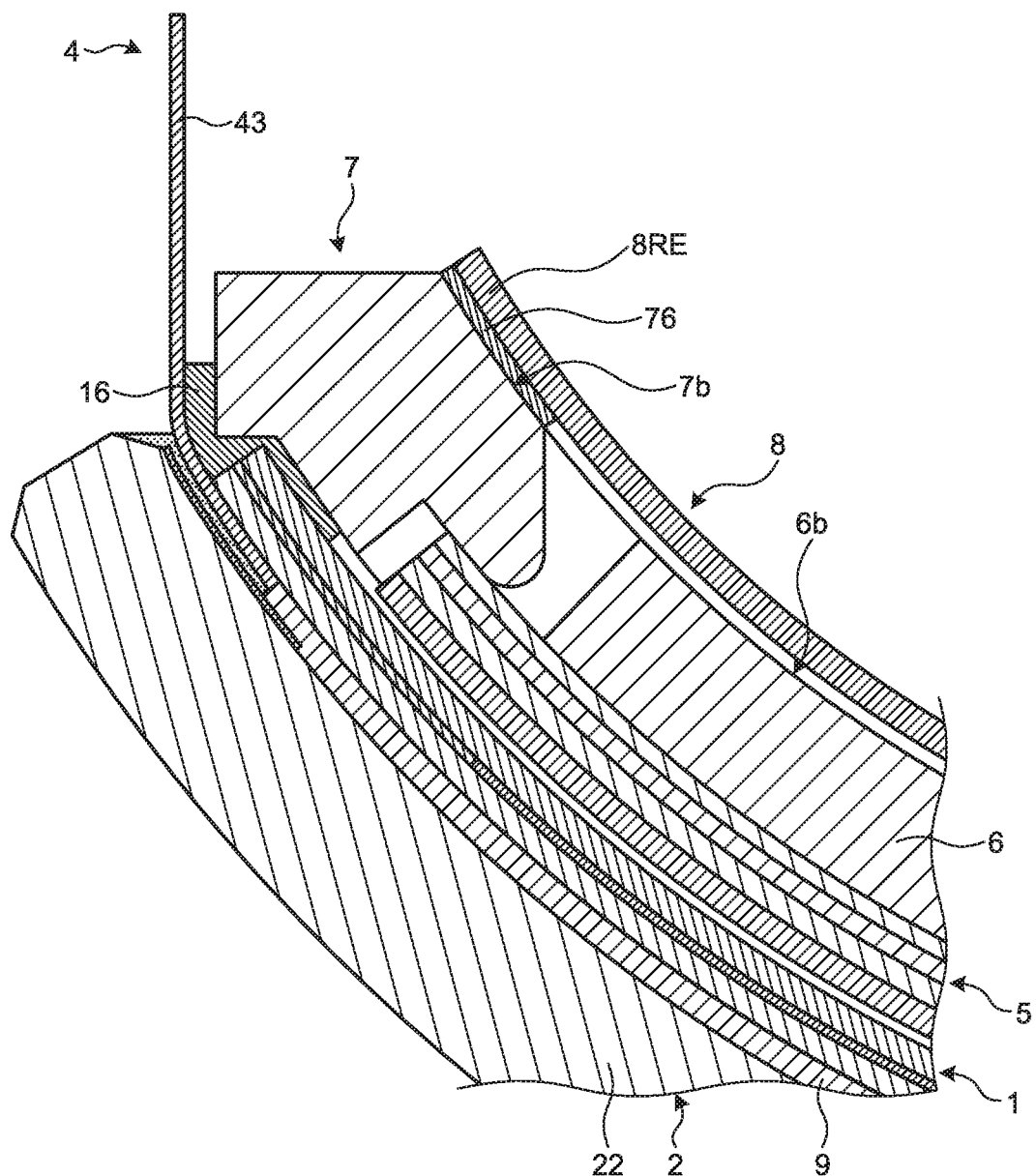
FIG. 18 is another cross-sectional view illustrating the assembly method of the display device according to the first embodiment process by process.

FIG. 13 is a flowchart illustrating an assembly method of the display device according to the first embodiment in a process sequence. FIGS. 14 to 18 are cross-sectional views sequentially illustrating the assembly method of the display device according to the first embodiment process by process. At step ST1 in FIG. 13, the coupling member 4 is attached to the cover panel 2. As exemplarily illustrated in FIG. 14, the cover panel 2 is placed in a manufacturing device (not illustrated) in such a state that the front surface 2a faces downwards and the rear surface 2b faces upwards. The manufacturing device applies the adhesive 26 onto the rear surface 2b of the outer perimeter portion 22 of the cover panel 2. The region onto which the adhesive 26 is applied overlaps with the light blocking member 25 in a plan view. The adhesive 26 is a hot-melt adhesive melted at a high temperature of approximately 150 degrees, for example. Subsequently, the manufacturing device causes the first surface 41a of the first portion 41 of the coupling member 4 to make contact with the applied adhesive 26. Curing of the adhesive 26 fixes the first portion 41 of the coupling member 4 to the outer perimeter portion 22.

At step ST2 in FIG. 13, the display panel 1 is attached to the cover panel 2. As exemplarily illustrated in FIG. 14, the manufacturing device adhesively attaches the adhesive layer 9 to the rear surface 2b of the cover panel 2. The region to which the adhesive layer 9 is adhesively attached is the inside 45 of the coupling member 4 (refer to FIG. 7). The adhesive layer 9 is made of an OCA or an OCR, for example. Subsequently, the manufacturing device causes the display surface 1a of the display panel 1 to make contact with the adhesive layer 9. Curing of the adhesive layer 9 fixes the display panel 1 to the cover panel 2.

At step ST3 in FIG. 13, the supporting member 7 is attached to the cover panel 2. As exemplarily illustrated in FIG. 15, the manufacturing device applies the adhesive 16 from the peripheral region 1fa of the display panel 1 (refer to FIG. 3) to the coupling member 4. The adhesive 16 is an RTV resin, for example. Subsequently, the manufacturing device causes the first surface 7a of the supporting member 7 to make contact with the applied adhesive 16. Curing of the adhesive 16 fixes the first surface 7a and a periphery thereof of the supporting member 7 to the display panel 1 and the coupling member 4.

At step ST4 in FIG. 13, the optical sheet 5 is placed in the inside 75 of the supporting member 7. As exemplarily illustrated in FIG. 16, the manufacturing device inserts both of a right edge portion 5RE and the left edge portion (not illustrated) of the optical sheet 5 into a gap 7AG between the latch 71 and the display panel 1 while bending the optical sheet 5. The third surface 7c of the supporting member 7, which is tilted with respect to each of the first surface 7a and the second surface 7b, is in parallel with the Z-axis direction, for example. Consequently, the third surface 7c guides the right edge portion 5RE and the left edge portion of the optical sheet 5 to move toward the display panel 1. The right edge portion 5RE and the left edge portion of the optical sheet 5 move toward the display panel 1 to enter the gap 7AG. This process releases the bending of the optical sheet 5. As a result, the optical sheet 5 is latched toward the display panel 1 by the latch 71.

At step S15 in FIG. 13, the light guiding plate 6 is attached to the rear surface of the optical sheet 5. As exemplarily illustrated in FIG. 17, the manufacturing device places the light guiding plate 6 in the inside 75 of the supporting member 7. Even if the adhesive has translucency, the adhesion of the adhesive to the light guiding plate 6 may possibly deteriorate a light guiding performance of the light guiding plate 6. Thus, the light guiding plate 6 is preferably not adhesively attached to the optical sheet 5.

At step ST6 in FIG. 13, the reflection sheet 8 is attached on the rear surface 6b of the light guiding plate 6. As exemplarily illustrated in FIG. 18, the manufacturing device places the double-sided adhesive tape 76 on the second surface 7b of the supporting member 7. Subsequently, the manufacturing device causes a right edge portion 8RE, and a left edge portion, a top edge portion, and a bottom edge portion, which are not illustrated, of the reflection sheet 8 to make contact with the double-sided adhesive tape 76. This process allows the reflection sheet 8 to be attached on the rear surface 6b of the light guiding plate 6. The light guiding plate 6 is sandwiched and fixed by the attached reflection sheet 8 and optical sheet 5.

At step ST7 in FIG. 13, the cover panel 2 is fixed to the housing 3. The manufacturing device inserts the third portion 43 of the coupling member 4 into the groove 35 of the housing 3 (refer to FIG. 3), for example. The third portion 43 is adhesively bonded to the side surfaces and the bottom surface of the groove 35 through the adhesive 36 (refer to FIG. 3). As a result, the cover panel 2 is fixed to the housing 3.

As described above, in the display device 100 according to the first embodiment, the first portion 41 of the coupling member 4 is disposed at a position overlapping with the peripheral region 1fa of the display panel 1 in a plan view. This configuration eliminates the need for securing a region beside the display panel 1, to which an adhesive adhesively bonding the cover panel 2 to the housing 3 is applied, thereby reducing the distance between the side surface of the display panel 1 and the housing 3. This configuration can narrow the light blocking region 2fa of the cover panel 2, thereby narrowing the frame region FA overlapping with the light blocking region 2fa in a plan view. As a result, the display device 100 can have a narrow frame.

In the right edge portion 100RE and the left edge portion 100LE of the display device 100, the outer perimeter portion 22 of the cover panel 2 is curved in a direction in which the outer perimeter portion 22 approaches the housing 3. The display panel 1 is curved along the outer perimeter portion 22 of the cover panel 2. This configuration allows the light blocking region 2fa of the cover panel 2 to be hardly recognized in a plan view in the right edge portion 100RE and the left edge portion 100LE of the display device 100. As a result, the display device 100 can have a narrower frame.

The first portion 41 of the coupling member 4 is not attached to the rear surface 1b of the display panel 1, but is attached to the rear surface 2b of the cover panel 2 through the adhesive 26. This configuration prevents the coupling member 4 from pulling the rear surface 1b of the display panel 1 even when a force is applied in a direction in which the cover panel 2 and the housing 2 are separated. As a result, the configuration can prevent the respective layers included in the display panel 1 from being separated from one another (e.g., between the first substrates 11 and the second substrate 12).

The coupling member 4 is a frame body. The display panel 1 is disposed in the inside 45 of the coupling member 4. With this configuration, when water enters the gap AG between the cover panel 2 and the housing 3, the coupling member 1 blocks water, thereby preventing water entering from the gap AG from being in contact with the display panel 1 in the inside 45 of the coupling member 4. As a result, the configuration can prevent the first and second polarizing plates included in the display panel 1 from deteriorating due to water.

Modifications of the First Embodiment

First Modification

Figure 19:
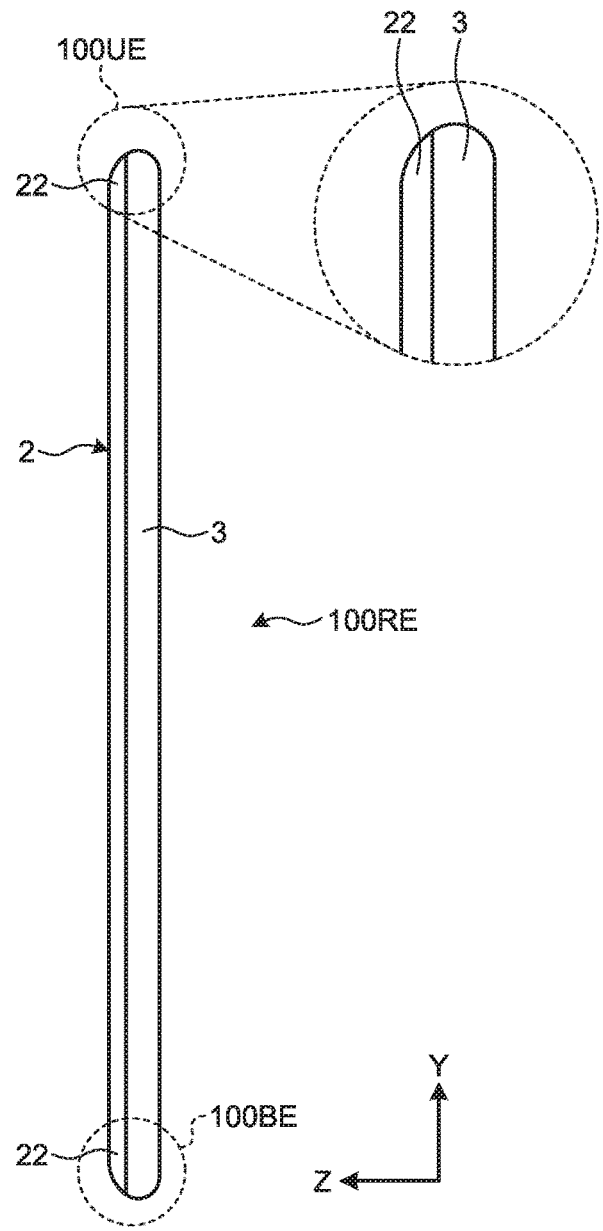
FIG. 19 is a right side view illustrating an exemplary configuration of the display device according to a first modification of the first embodiment.
Figure 20:
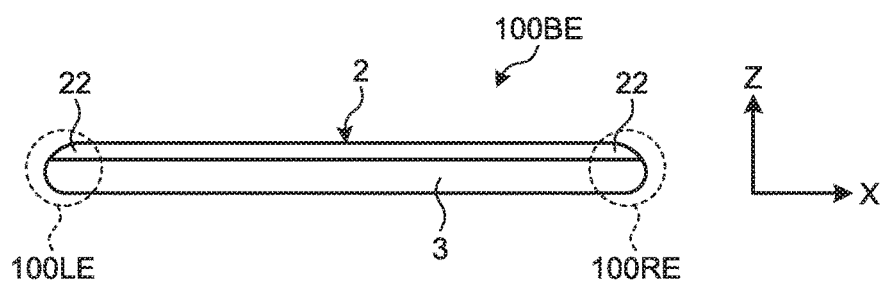
FIG. 20 is a bottom view illustrating the exemplary configuration of the display device according to the first modification of the first embodiment.

In the first embodiment, the outer perimeter portion 22 of the cover panel 2 is curved in a direction in which the outer perimeter portion 22 approaches the housing 3 in the right edge portion 100RE and the left edge portion 100LE (refer to FIGS. 2 and 4). In the first embodiment, the outer perimeter portion 22 of the cover panel 2 may be curved in a direction in which the outer perimeter portion 22 approaches the housing 3 not only in the right edge portion 100RE and the left edge portion 100LE but also in the bottom edge portion 100BE and the top edge portion 100UE. In other words, the outer perimeter portion 22 may be curved in a direction that the outer perimeter portion 22 approaches the housing 3 throughout the entire perimeter of the display device 100. FIG. 19 is a right side view illustrating an exemplary configuration of the display device according to a first modification of the first embodiment. FIG. 20 is a bottom view illustrating the exemplary configuration of the display device according to the first modification of the first embodiment. In the first modification illustrated in FIGS. 19 and 20, the outer perimeter portion 22 is curved in a direction in which the outer perimeter portion 22 approaches the housing 3 in all of the right edge portion 100RE, the left edge portion 100LE, the bottom edge portion 100BE, and the top edge portion 100UE. This configuration allows the light blocking region 2fa of the coves panel 2 (refer to FIGS. 3, 5, and 6) to be hardly recognized in a plan view in all of the right edge portion 100RE, the left edge portion 100LE, the bottom edge portion 100BE, and the top edge portion 100UE.

Second Modification

Figure 21:
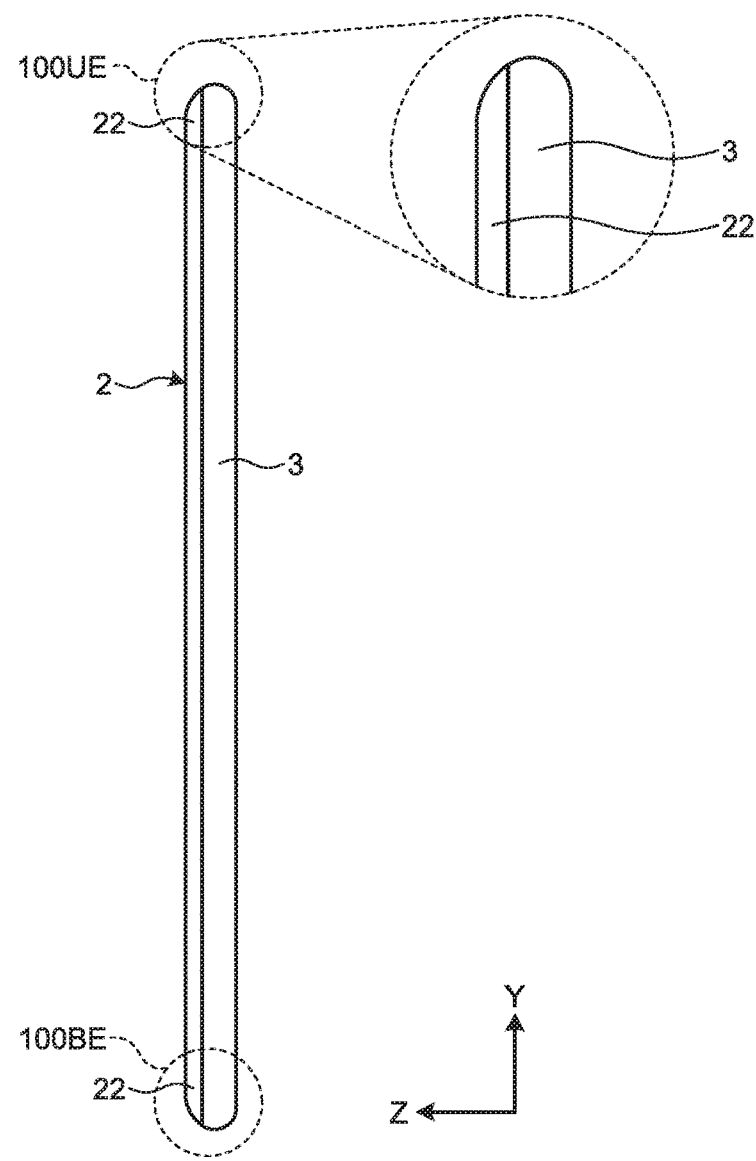
FIG. 21 is a right side view illustrating an exemplary configuration of the display device according to a second modification of the first embodiment.
Figure 22:
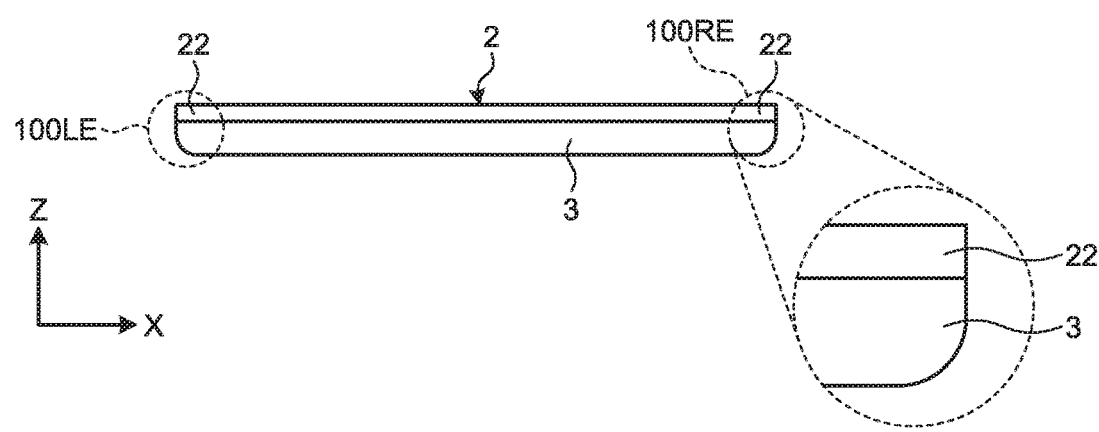
FIG. 22 is a bottom view illustrating the exemplary configuration of the display device according to the second modification of the first embodiment.

In the first embodiment, the outer perimeter portion 22 may be curved in a direction in which the outer perimeter portion 22 approaches the housing 3 not in the edge portions on the long side of the display device 100 (e.g., the right edge portion 100RE and the left edge portion 100LE), but in the bottom edge portions on the short side of the display device 100 (e.g., the bottom edge portion 100BE and the top edge portion 100UE). FIG. 21 is a right side view illustrating an exemplary configuration of the display device according to a second modification of the first embodiment. FIG. 22 is a bottom view illustrating the exemplary configuration of the display device according to the second modification of the first embodiment. In the second modification illustrated in FIGS. 21 and 22, the outer perimeter portion 22 is curved in a direction in which the outer perimeter portion 22 approaches the housing 3 in the bottom edge portion 100BE and the top edge portion 100UE. In the right edge portion 100RE and the left edge portion 100LE, the outer perimeter portion 22 is not curved. In the right edge portion 100RE and the left edge portion 100LE, the outer perimeter portion 22 is formed as a flat plate in parallel with the X-Y plane. This configuration allows the light blocking region 2fa of the cover panel 2 (refer to FIGS. 5 and 6) to be hardly recognized in a plan view in the bottom edge portion 100BE and the top edge portion 100UE, which are the edge portions on the short side.

Alternatively, the short sides and the long sides of the edge portions of the display device 100 may be interchanged. For example, in FIG. 1A, the display device 100 may be the display device having a horizontally long shape, in which the length in the X-direction is larger than that in the Y-direction. In this case, the right edge portion 100RE and the left edge portion 100LE serve as the edge portions on the short side of the display device 100 while the bottom edge portion 100BE and the top edge portion 100UE serve as the edge portions on the long side of the display device 100. This configuration allows the light blocking region 2fa (refer to FIG. 2) of the cover panel 2 to be hardly recognized in a plan view in the right edge portion 100RE and the left edge portion 100LE, which serve as the edge portions on the short side of the display device 100.

Third Modification

Figure 23:
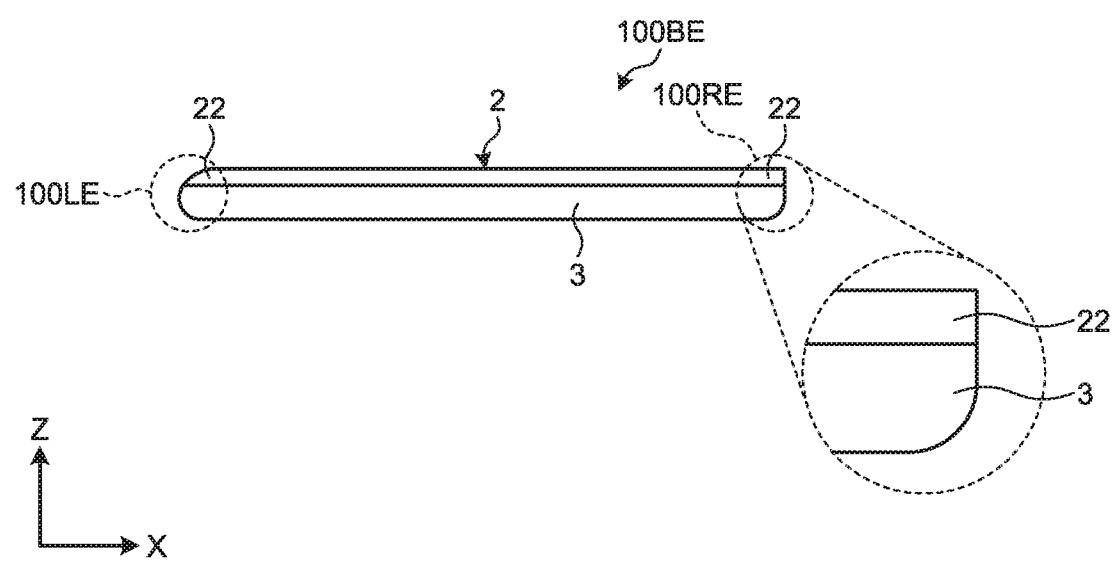
FIG. 23 is a bottom view illustrating an exemplary configuration of the display device according to a third modification of the first embodiment.

In the first embodiment or in the first modification of the first embodiment, the outer perimeter portion 22 of the cover panel 2 is curved in a direction in which the outer perimeter portion 22 approaches the housing 3 in the right edge portion 100RE and the left edge portion 100LE (refer to FIGS. 1C and 20). In the first embodiment, the outer perimeter portion 22 of the cover panel 2 may be curved in a direction in which the outer perimeter portion 22 approaches the housing 3 only in one of the right edge portion 100RE and the left edge portion 100LE. FIG. 23 is a bottom view illustrating an exemplary configuration of the display device according to a third modification of the first embodiment. In the third modification illustrated in FIG. 23, the outer perimeter portion 22 is curved in a direction in which the outer perimeter portion 22 approaches the housing 3 only in the left edge portion 100LE. In the right edge portion 100RE, the outer perimeter portion 22 is not curved and is formed as a flat plate in parallel with the X-Y plane. This configuration allows the light blocking region to be hardly recognized in a plan view in the left edge portion 100LE, thereby achieving a narrow frame in the display device 100.

Fourth Modification

Figure 24:
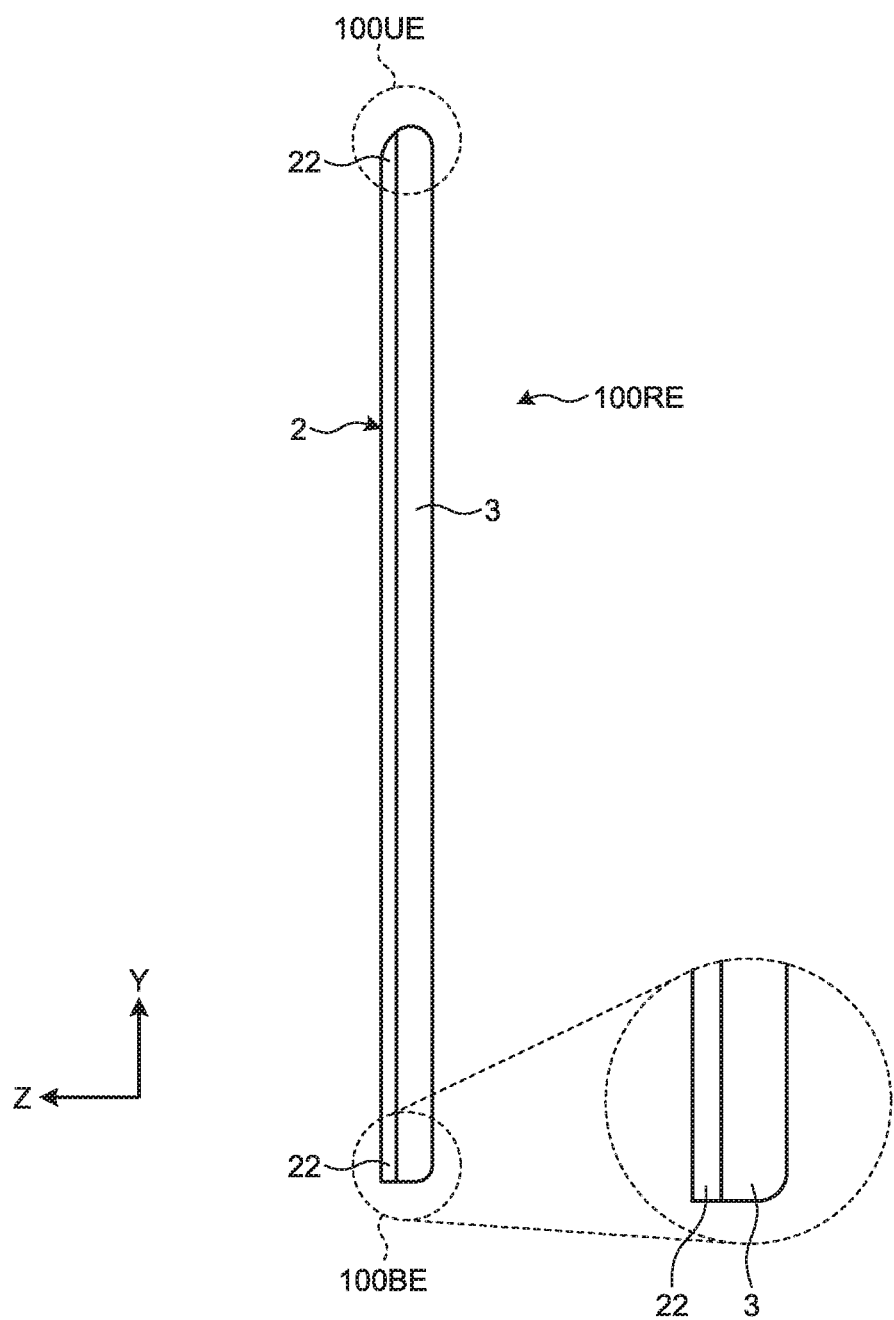
FIG. 24 is a right side view illustrating an exemplary configuration of the display device according to a fourth modification of the first embodiment.

In the first modification or the second modification of the first embodiment, the outer perimeter portion 22 of the cover panel 2 is curved in a direction in which the outer perimeter portion 22 approaches the housing 3 in the bottom edge portion 4BE and the top edge portion 4UE (refer to FIGS. 19 and 21). In the first embodiment, the outer perimeter portion 22 of the cover panel 2 may be curved in a direction in which the outer perimeter portion 22 approaches the housing 3 only in one of the bottom edge portion 4BE and the top edge portion 4UE. FIG. 24 is a bottom view illustrating an exemplary configuration of the display device according to a fourth modification of the first embodiment. In the fourth modification illustrated in FIG. 24, the outer perimeter portion 22 is curved in a direction in which the outer perimeter portion 22 approaches the housing 3 only in the top edge portion 4UE. In the bottom edge portion 4BE, the outer perimeter portion 22 is not curved and is formed as a flat plate in parallel with the plane. This configuration allows the light blocking region to be hardly recognized in a plan view in the top edge portion 4UE, thereby achieving a narrow frame in the display device 100.

Fifth Modification

In the first embodiment, the coupling member 4 is a frame body. The coupling member 4 includes the right edge portion 4RE, the left edge portion 4LE, the bottom edge portion 4BE, and the top edge portion 4UE. In the first embodiment, the coupling member 4 may not be a frame body. For example, when the left edge portion 100LE and the right edge portion 100LE are larger than the bottom edge portion 100BE and the top edge portion 100UE of the display device 100, the coupling member 4 may include only the right edge portion 4RE and the left edge portion 4LE. The coupling member 4 may be disposed at positions corresponding to the right edge portion 100RE and the left edge portion 100LE, and may not be disposed at positions corresponding to the bottom edge portion 100BE and the top edge portion 100UE. Even in such a case, the first portion 41 is attached at a position overlapping with the peripheral region 1fa of the display panel 1 in a plan view. Consequently, a narrow frame can be achieved in the right edge portion 100RE and the left edge portion 100LE. A peripheral apparatus such as a speaker and an imaging device may be arranged in the bottom edge portion 100BE and the top edge portion 100UE of the display device 100. In this case, the cover panel 2 and the housing 3 may be coupled to each other through the peripheral apparatus in the bottom edge portion 100BE and the top edge portion 100UE.

Second Embodiment

Figure 25A:
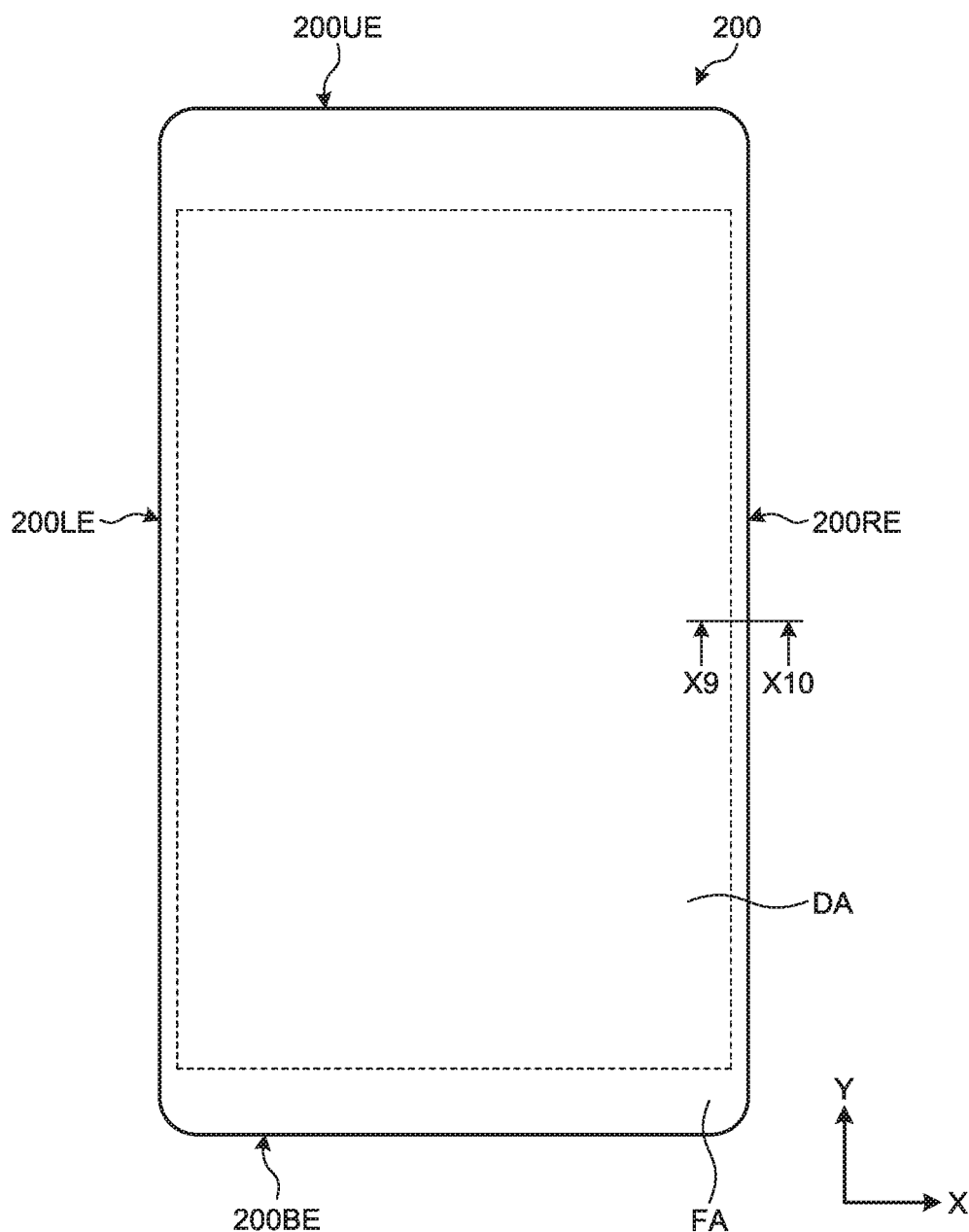
FIG. 25A is a plan view illustrating an exemplary configuration of a display device according to a second embodiment.
Figure 25B:
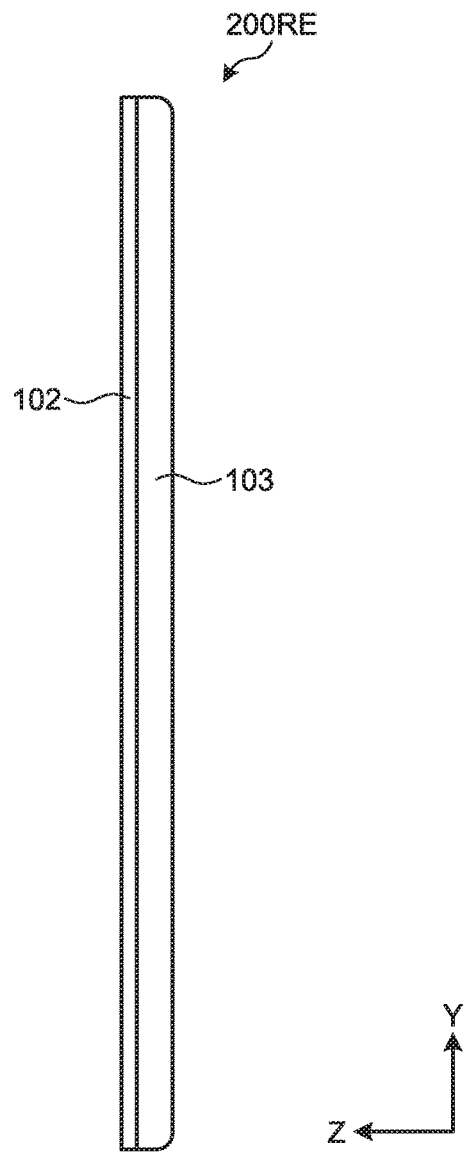
FIG. 25B is a right side view illustrating the exemplary configuration of the display device according to the second embodiment.
Figure 25C:
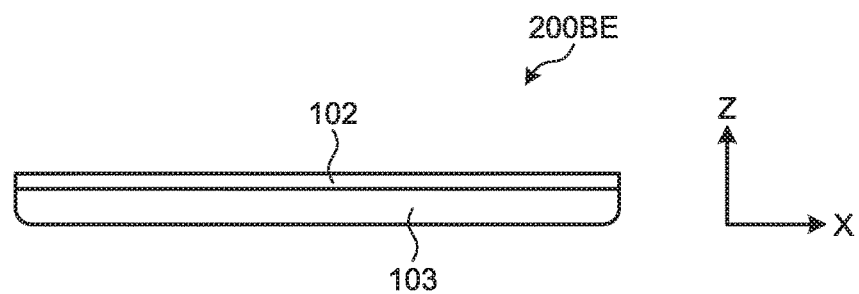
FIG. 25C is a bottom view illustrating the exemplary configuration of the display device according to the second embodiment.
Figure 26:
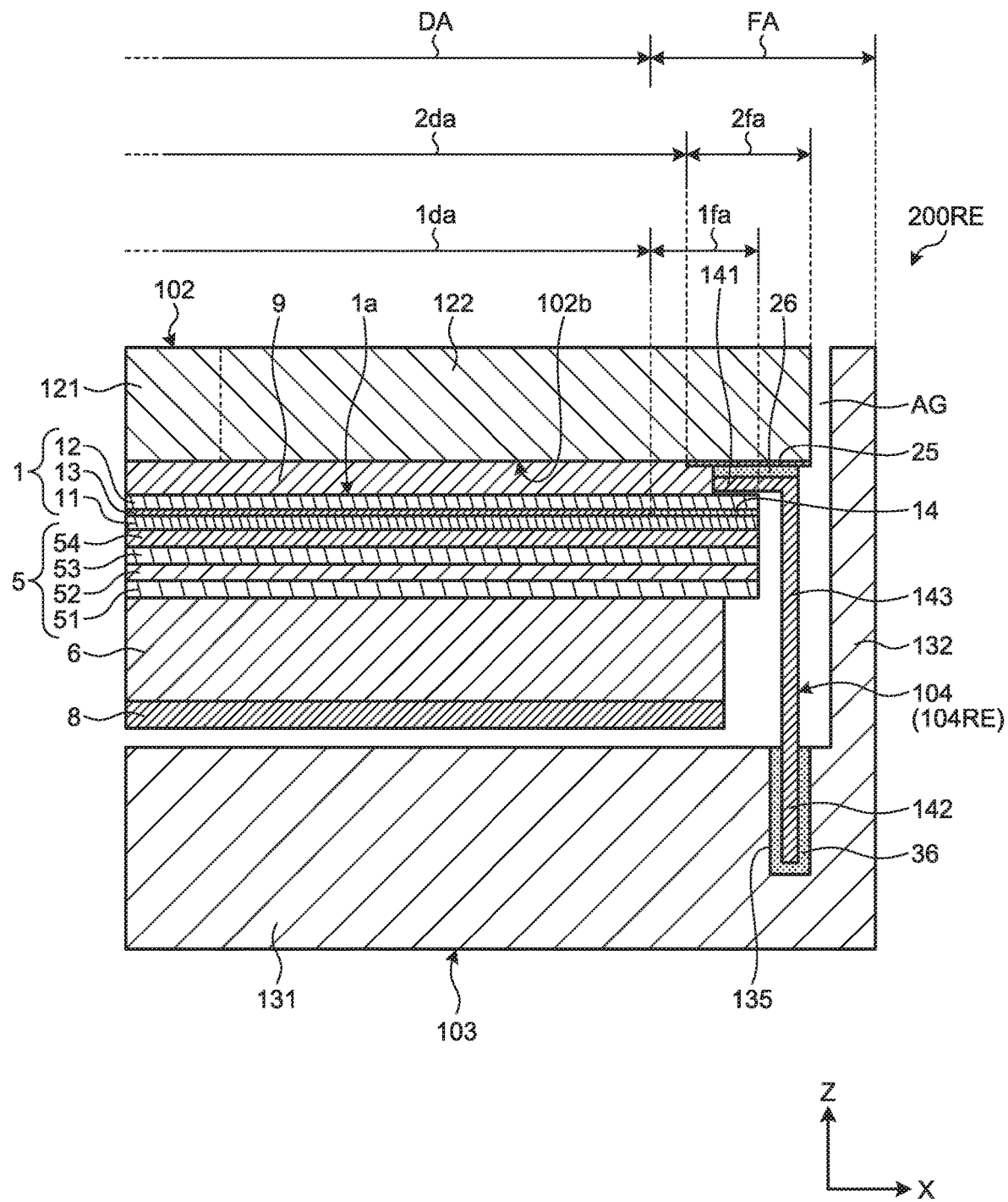
FIG. 26 is a cross-sectional view illustrating the exemplary configuration of the display device according to the second embodiment.

In the first embodiment, at least a part of the outer perimeter portion 22 of the cover panel 2 is curved. In a second embodiment, the outer perimeter portion of the cover panel is not curved and the cover panel has a flat plate shape from a main portion to an outer perimeter portion. FIGS. 25A, 25B, and 25C are a plan view, a right side view, and a bottom view, respectively, each illustrating an exemplary configuration of a display device according to the second embodiment. FIG. 26 is a cross-sectional view illustrating the exemplary configuration of the display device according to the second embodiment. Specifically, FIG. 25B illustrates a right edge portion 200RE of a display device 200. FIG. 25C illustrates a bottom edge portion 200BE of the display device 200. FIG. 26 illustrates an enlarged sectional view of the right edge portion 200RE of the display device 200 along the line X9-X10 (refer to FIG. 25A).

As illustrated in FIGS. 25A to 26, the display device 200 in the second embodiment includes the display panel 1, a cover panel 102, a housing 103, a coupling member 104, the optical sheet 5, the right guiding plate 6, the reflection sheet 8, the adhesive layer 9, and a light source. Similarly to the display device 100 described in the first embodiment, the display device 200 is also a transmissive liquid crystal display device, for example. The display device 200 includes the display region DA that displays an image and the frame region FA positioned at the outer perimeter of the display region DA.

The cover panel 102 is disposed close to the display surface 1a of the display panel 1. The cover panel 102 has a rectangular planar shape, for example. In a plan view, the cover panel 102 is larger than the display panel 1. The edge portion of the cover panel 102 is postioned closer to the outer perimeter of the display device 200 than the edge portion of the display panel 1. The cover panel 102 includes a main portion 121 having flat surfaces in parallel with the X-Y plane and an outer perimeter portion 122 positioned close to the outer perimeter of the main portion 121. The outer perimeter portion 122 of the cover panel 102 is not curved. The cover panel 102 is a flat plate in parallel with the X-Y plane from the main portion 121 to the outer perimeter portion 122. The cover panel 102 is made of glass or a resin.

The housing 103 includes: for example, a bottom portion 131; a wall portion 132 standing from the outer edge of the bottom portion 131 toward the display panel 1; and a groove 135 provided in the bottom portion 131 along the wall portion 132. The housing 103 is a frame body made of a resin, or includes an outer frame made of a metal (metal plate) and a resin mold inside the outer frame, for example.

The coupling member 104 couples the outer perimeter portion 122 of the cover panel 102 to the inside of the housing 103. The coupling member 104 includes a first portion 141, a second portion 142 positioned on the opposite side of the first portion 141, and a third portion 143 positioned between the first portion 141 and the second portion 142. The first portion 141 is disposed between the peripheral region 1fa of the display panel 1 and the outer perimeter portion 122 of the cover panel 102. The first portion 141 is fixed to a rear surface 102b of the outer perimeter portion 122 through the light blocking member 25 and the adhesive 26. The second portion 142, which is disposed in the groove 135 of the housing 103, fixed to the side surfaces and the bottom surface of the groove 135 through the adhesive 36. The third portion 143 is disposed along the wall portion 132 of the housing 103. Accordingly, the coupling member 104 fixes the cover panel 102 to the housing 103. The coupling member 104 is made of a metal (metal plate), for example.

The coupling member 104 is a frame body, for example. The coupling member 104 includes a right edge portion 104RE, and further includes a left edge portion, a top edge portion, and a bottom edge portion, which are not illustrated. The right edge portion 104RE of the coupling member 104 is disposed to a right edge portion 200RE of the display device 200. The left edge portion of the coupling member 104 is disposed at a position corresponding to a left edge portion 200LE of the display device 200. The top edge portion of the coupling member 104 is disposed at a position corresponding to a top edge portion 200UE of the display device 200. The bottom edge portion of the coupling member 104 is disposed at a position corresponding to a bottom edge portion 200BE of the display device 200. The display panel 1 is disposed in the inside of the frame body constituted by the right edge portion 104RE, the left edge portion, the top edge portion, and the bottom edge portion.

The first portion 141 is not curved but is in parallel with the X-Y plane in the right edge portion 104RE, the left edge portion, the top edge portion and the bottom edge portion of the coupling member 104. The second portion 142 and the third portion 113 are not curved but are in parallel with the wall portion 132 of the housing 103 in the right edge portion 104RE, the left edge portion, the top edge portion and the bottom edge portion of the coupling member 104. The shape of the left edge portion and the shape of the right edge portion 104RE illustrated in FIG. 26 are symmetric about the Y-Z, plane, for example. The size of the left edge portion of the coupling member 104 is the same as that of the right edge portion 104RE. The top edge portion of the coupling member 104 has the same shape and the same size as those of the top edge portion 4UE of the coupling member 4 illustrated in FIG. 5. The bottom edge portion of the coupling member 104 has the same shape and the same size as those of the bottom edge portion 4BE of the coupling member 4 illustrated in FIG. 6. The coupling member 104 has an identical thickness. The coupling member 104 has the same thickness as the thickness t of the coupling member 4 illustrated in FIG. 8.

In the display device 200 according to the second embodiment, the first portion 141 of the coupling member 104 is disposed at a position overlapping with the peripheral region 1$fa$ of the display panel 1 in a plan view. This configuration eliminates the need for securing a region beside the display panel 1, to which an adhesive adhesively bonding the cover panel 102 to the housing 103 is applied, thereby reducing the distance between the side surface of the display panel 1 and the housing 103. This configuration can narrow the light blocking region 2$fa$ of the cover panel 102, thereby narrowing the frame region FA overlapping with the light blocking region 2$fa$ in a plan view. Accordingly a narrow frame can be achieved in the display device 200.

The modifications of the first embodiment are also applicable to the second embodiment. The coupling member 104 may not be a frame body. The coupling member 104 may include only the right edge portion 104RE and the left edge portion. The coupling member 104 may be disposed at positions corresponding to the right edge portion 200RE and the left edge portion 200LE of the display device 200, and may not be disposed at positions corresponding to the bottom edge portion 200BE and the top edge portion 200UE. Even in such a case, the first portion 141 is attached at a position overlapping with the peripheral region 1$fa$ of the display panel 1. Accordingly, a narrow frame can be achieved in the right edge portion 200RE and the left edge portion 200LE. In this case, the cover panel 102 and the housing 103 may be coupled to each other through the peripheral apparatus in the bottom edge portion 200BE and the top edge portion 200UE.

While exemplary embodiments and modifications thereof according to the present disclosure have been described, the embodiments and the modifications thereof are not intended to limit the present disclosure. The contents disclosed in the embodiments and the modifications thereof are given by way of example only, and various changes may be made without departing from the spirit of the present disclosure. In the first and the second embodiments, the display devices 100 and 200 are exemplified as the transmissive liquid crystal display devices capable of displaying color images. The disclosure is, however, not limited to the transmissive liquid crystal display devices capable of displaying color images. The disclosure may be applicable to transmissive liquid crystal display devices capable of displaying monochrome images. The disclosure is not limited to the liquid crystal display devices. The disclosure is applicable to organic electroluminescence display devices. The appropriate modifications made without departing from the spirit of the disclosure naturally fall within the technical scope of the disclosure.

The display device according to the present disclosure includes the following aspects, for example.

(1) A display device comprising:
 a display panel;
 a cover panel disposed close to a display surface of the display panel;
 a housing disposed close to a rear surface of the display panel; and
 a coupling member coupling the cover panel and the housing to each other, wherein
 the coupling member includes:
 a first portion disposed between the cover panel and the display panel, and attached to the cover panel; and
 a second portion attached to an inside of the housing.

(2) The display device according to (1), wherein
 the housing includes:
 a bottom portion;
 a wall portion standing from an outer edge of the bottom portion toward the display panel; and
 a groove provided in the bottom portion along the wall portion, and
 the second portion is disposed in the groove.

(3) The display device according to (2), wherein
 the coupling member further includes a third portion positioned between the first portion and the second portion, and
 the third portion is disposed along the wall portion.

(4) The display device according to any one of (1) to (3), wherein the coupling member surrounds the display panel.

(5) The display device according to any one of (1) to (4), wherein
 the display panel includes:
 a display region displaying an image; and
 a peripheral region positioned at a periphery of the display region, and
 the coupling member is disposed between the cover panel and the peripheral region.

(6) The display device according to any one of (1) to (5), wherein
 the cover panel includes:
 a main portion having a flat surface; and
 an outer perimeter portion positioned around an outer perimeter of the main portion and having a curved surface,
 the outer perimeter portion is curved in a direction in which the outer perimeter portion approaches the housing, and
 the display panel is curved along the outer perimeter portion.

(7) The display device according to (6), wherein the first portion is curved along the outer perimeter portion.

(8) The display device according to (6) or (7), further comprising:
an optical sheet disposed close to the rear surface of the display panel; and
a supporting member disposed close to the rear surface of the display panel, and attached in the peripheral region, wherein
the supporting member supports the optical sheet toward the display panel.
(9) The display device according to (8), wherein
the supporting member includes a first surface facing the peripheral region, and
the first surface is curved along the outer perimeter portion of the cover panel.
(10) The display device according to (9), wherein
the supporting member further includes a second surface positioned on an opposite side of the first surface, and
the second surface is curved along the outer perimeter portion of the cover panel.
(11) The display device according to (10), wherein
the supporting member is a frame body, and further includes a third surface,
the third surface is positioned between the first surface and the second surface, and faces an inside of the frame body, and
the third surface is in parallel with a thickness direction of the supporting member.
(12) A display device comprising:
a display panel;
a cover panel disposed close to a display surface of the display panel;
a housing disposed close to a rear surface of the display panel; and
a coupling member coupling the cover panel and an inside of the housing to each other, wherein
the cover panel includes:
a main portion having a flat surface; and
an outer perimeter portion positioned around an outer perimeter of the main portion and having a curved surface,
the outer perimeter portion is curved in a direction in which the outer perimeter portion approaches the housing, and
the display panel is curved along the outer perimeter portion.

A manufacturing method of a display device according to the present disclosure includes the following aspects, for example.

(13) A manufacturing method of a display device, comprising:
placing a cover panel close to a display surface of a display panel;
placing a housing close to a rear surface of the display panel; and
coupling the cover panel and the housing to each other, wherein
the coupling includes:
placing a first portion of the coupling member between the cover panel and the display panel and attaching the first portion to the cover panel; and
attaching a second portion of the coupling member to an inside of the housing.
(14) The manufacturing method of the display device according to (13), wherein
the housing includes:
a bottom portion;
a wall portion standing from an outer edge of the bottom portion toward the display panel; and
a groove provided in the bottom portion along the wall portion, and
the coupling includes placing the second portion in the groove.
(15) The manufacturing method of the display device according to (14), wherein
the coupling member further includes a third portion positioned between the first portion and the second portion, and
the coupling includes placing the third portion along the wall portion.
(16) The manufacturing method of the display device according to any one of (13) to (15), wherein
the coupling is performed such that the coupling member surrounds the display panel.
(17) The manufacturing method of the display device according to any one of (13) to (16), wherein
the display panel includes:
a display region displaying an image; and
a peripheral region positioned at a periphery of the display region, and
the coupling includes placing the coupling member between the cover panel and the peripheral region.

What is claimed is:
1. A display device comprising:
a display panel;
a cover panel disposed close to a display surface of the display panel;
a housing disposed close to a rear surface of the display panel; and
a coupling member coupling the cover panel and the housing to each other, wherein
the coupling member includes:
a first portion disposed between the cover panel and the display panel, and attached to the cover panel; and
a second portion attached to an inside of the housing, and
the cover panel includes:
a main portion having a flat surface; and
an outer perimeter portion positioned around an outer perimeter of the main portion and having a curved surface, wherein
the outer perimeter portion is curved in a direction in which the outer perimeter portion approaches the housing, and
the display panel is curved along the outer perimeter portion;
an optical sheet disposed close to the rear surface of the display panel; and
a supporting member disposed close to the rear surface of the display panel, and attached in the peripheral region, wherein
the supporting member supports the optical sheet toward the display panel,
the supporting member includes a first surface facing the peripheral region, and
the first surface is curved along the outer perimeter portion of the cover panel.
2. The display device according to claim 1, wherein
the housing includes:
a bottom portion;
a wall portion standing from an outer edge of the bottom portion toward the display panel; and
a groove provided in the bottom portion along the wall portion, and the second portion is disposed in the groove.

3. The display device according to claim 2, wherein
the coupling member further includes a third portion positioned between the first portion and the second portion, and
the third portion is disposed along the wall portion.

4. The display device according to claim 1, wherein the coupling member surrounds the display panel.

5. The display device according to claim 1, wherein
the display panel includes:
 a display region displaying an image; and
 a peripheral region positioned at a periphery of the display region, and
the coupling member is disposed between the cover panel and the peripheral region.

6. The display device according to claim 1, wherein the first portion is curved along the outer perimeter portion.

7. The display device according to claim 1, wherein
the supporting member further includes a second surface positioned on an opposite side of the first surface, and
the second surface is curved along the outer perimeter portion of the cover panel.

8. The display device according to claim 7, wherein
the supporting member is a frame body, and further includes a third surface,
the third surface is positioned between the first surface and the second surface, and faces an inside of the frame body, and
the third surface is in parallel with a thickness direction of the supporting member.

* * * * *